US011736290B1

(12) United States Patent
Dods et al.

(10) Patent No.: US 11,736,290 B1
(45) Date of Patent: Aug. 22, 2023

(54) MANAGEMENT OF RECIPIENT CREDENTIALS LEVERAGING PRIVATE KEYS ON KEYSTORES READ BY PROVISIONED DEVICES

(71) Applicant: LedgerDomain Inc., Las Vegas, NV (US)

(72) Inventors: Victor Bovee Dods, Seattle, WA (US); Benjamin James Taylor, Las Vegas, NV (US); Benjamin Gregory Nichols, New Plymouth (NZ)

(73) Assignee: LedgerDomain Inc., Las Vegas, NV (US)

( * ) Notice: Subject to any disclaimer, the term of this patent is extended or adjusted under 35 U.S.C. 154(b) by 0 days.

(21) Appl. No.: 17/982,509

(22) Filed: Nov. 7, 2022

(51) Int. Cl.
*H04L 29/06* (2006.01)
*H04L 9/30* (2006.01)
*H04L 9/40* (2022.01)

(52) U.S. Cl.
CPC .............. *H04L 9/30* (2013.01); *H04L 63/101* (2013.01)

(58) Field of Classification Search
CPC .. H04L 63/0823; H04L 63/108; H04L 63/105
See application file for complete search history.

(56) References Cited

U.S. PATENT DOCUMENTS

| 7,170,391 | B2 | 1/2007 | Lane et al. |
|---|---|---|---|
| 9,870,508 | B1 | 1/2018 | Hodgson et al. |
| 10,268,974 | B2 | 4/2019 | Wiig et al. |
| 10,491,404 | B1 | 11/2019 | Yamamoto |
| 10,491,578 | B1 | 11/2019 | Hebert et al. |
| 10,496,802 | B2 | 12/2019 | Weis |
| 10,509,684 | B2 | 12/2019 | Florissi et al. |
| 10,516,525 | B2 | 12/2019 | Bhattacharya et al. |
| 10,540,704 | B2 | 1/2020 | Mazed et al. |
| 10,542,046 | B2 | 1/2020 | Katragadda et al. |
| 10,990,693 | B1 | 4/2021 | Newman |
| 11,468,046 | B2 | 10/2022 | Conley et al. |
| 11,509,709 | B1 | 11/2022 | Basak et al. |
| 2012/0130905 | A1 | 5/2012 | Tsudik et al. |
| 2014/0006048 | A1 | 1/2014 | Liberty |
| 2014/0025443 | A1 | 1/2014 | Onischuk |

(Continued)

FOREIGN PATENT DOCUMENTS

| CN | 110597902 A | 12/2019 |
|---|---|---|
| WO | 2018206408 A1 | 11/2018 |

(Continued)

OTHER PUBLICATIONS

Looker et. al., BBS+ Signatures 2020 Draft Community Group Report, W3C Community Group, dated Jun. 13, 2021, 31 pages. Retrieved on Oct. 3, 2021. Retrieved from the internet [URL: https://w3c-ccg.github.io/ldp-bbs2020/ ].

(Continued)

*Primary Examiner* — Tri M Tran

(74) *Attorney, Agent, or Firm* — Haynes Beffel & Wolfeld LLP; Andrew L. Dunlap; Paul A. Durdik

(57) ABSTRACT

The disclosed technology teaches a method for managing user access to one of a set of decentralized networked nodes that share a private permissioned blockchain data structure or a decentralized personal ledger, to which access has been limited to users authorized by one of the set of decentralized networked nodes.

28 Claims, 13 Drawing Sheets

(56) References Cited

U.S. PATENT DOCUMENTS

| | | |
|---|---|---|
| 2015/0262171 A1 | 9/2015 | Langschaedel et al. |
| 2015/0269379 A1 | 9/2015 | Ramzan et al. |
| 2016/0125199 A1 | 5/2016 | Lee et al. |
| 2016/0155069 A1 | 6/2016 | Hoover et al. |
| 2016/0212146 A1 | 7/2016 | Wilson |
| 2017/0103167 A1 | 4/2017 | Shah |
| 2017/0221032 A1 | 8/2017 | Mazed |
| 2017/0286880 A1 | 10/2017 | Wiig et al. |
| 2017/0310653 A1 | 10/2017 | Zhang |
| 2018/0114169 A1 | 4/2018 | Wiig et al. |
| 2018/0139186 A1 | 5/2018 | Castagna |
| 2019/0012249 A1 | 1/2019 | Mercuri et al. |
| 2019/0020661 A1 | 1/2019 | Zhang |
| 2019/0026450 A1 | 1/2019 | Egner et al. |
| 2019/0051079 A1 | 2/2019 | Venkataraman et al. |
| 2019/0057386 A1 | 2/2019 | Fazeli et al. |
| 2019/0058599 A1 | 2/2019 | Takada Chino et al. |
| 2019/0068562 A1 | 2/2019 | Iyer et al. |
| 2019/0075102 A1 | 3/2019 | Kim et al. |
| 2019/0108898 A1 | 4/2019 | Gulati |
| 2019/0138905 A1 | 5/2019 | Akella et al. |
| 2019/0138971 A1 | 5/2019 | Uggirala et al. |
| 2019/0171438 A1 | 6/2019 | Franchitti |
| 2019/0180276 A1 | 6/2019 | Lee et al. |
| 2019/0228174 A1 | 7/2019 | Withrow et al. |
| 2019/0251295 A1 | 8/2019 | Vieyra |
| 2019/0281066 A1 | 9/2019 | Simons |
| 2019/0325507 A1 | 10/2019 | Rowley et al. |
| 2019/0333116 A1 | 10/2019 | Bhardwaj et al. |
| 2019/0334716 A1 | 10/2019 | Kocsis et al. |
| 2019/0392162 A1 | 12/2019 | Stern et al. |
| 2020/0005133 A1 | 1/2020 | Zhang et al. |
| 2020/0013229 A1 | 1/2020 | Lee et al. |
| 2020/0019288 A1 | 1/2020 | D'Amore et al. |
| 2020/0084483 A1 | 3/2020 | Brown et al. |
| 2020/0110821 A1 | 4/2020 | Chan et al. |
| 2020/0118060 A1 | 4/2020 | Mukherjee et al. |
| 2020/0153606 A1* | 5/2020 | Li .............................. H04L 9/30 |
| 2020/0186358 A1 | 6/2020 | Capola et al. |
| 2020/0252205 A1 | 8/2020 | Padmanabhan |
| 2020/0258166 A1 | 8/2020 | Cross et al. |
| 2020/0268260 A1 | 8/2020 | Tran |
| 2020/0294033 A1 | 9/2020 | Wilson et al. |
| 2020/0320207 A1 | 10/2020 | Beno et al. |
| 2020/0322169 A1 | 10/2020 | Michaud et al. |
| 2020/0374137 A1 | 11/2020 | Godfrey |
| 2020/0403809 A1 | 12/2020 | Chan et al. |
| 2021/0034779 A1 | 2/2021 | Signorini et al. |
| 2021/0126797 A1 | 4/2021 | Peng |
| 2021/0136068 A1 | 5/2021 | Smeets et al. |
| 2021/0150205 A1 | 5/2021 | Snyder et al. |
| 2021/0174914 A1 | 6/2021 | Cano et al. |
| 2021/0182539 A1 | 6/2021 | Rassool |
| 2021/0208960 A1 | 7/2021 | Dande et al. |
| 2021/0218720 A1 | 7/2021 | Oberhauser et al. |
| 2021/0234672 A1 | 7/2021 | Zeng et al. |
| 2021/0264520 A1 | 8/2021 | Cummings |
| 2022/0051240 A1 | 2/2022 | Shamai et al. |
| 2022/0051314 A1 | 2/2022 | Enkhtaivan |
| 2022/0052988 A1 | 2/2022 | Gadnis et al. |
| 2022/0083936 A1 | 3/2022 | Balinsky et al. |
| 2022/0150077 A1 | 5/2022 | Kim |
| 2022/0179378 A1 | 6/2022 | Gourisetti et al. |
| 2022/0405750 A1 | 12/2022 | Fallah et al. |
| 2022/0407856 A1 | 12/2022 | Jawed |
| 2022/0417331 A1 | 12/2022 | Devine et al. |
| 2023/0006845 A1 | 1/2023 | Leedom, Jr. |

FOREIGN PATENT DOCUMENTS

| | | | |
|---|---|---|---|
| WO | 2019086553 A1 | 5/2019 | |
| WO | 2019090264 A1 | 5/2019 | |
| WO | 2019090268 A1 | 5/2019 | |
| WO | 2019207297 A1 | 10/2019 | |
| WO | 2020006121 A1 | 1/2020 | |
| WO | WO-2021127577 A1 * | 6/2021 | ............. G06F 21/31 |

OTHER PUBLICATIONS

Hyperledger, Ursa, Github, updated 2021, 7 pages. Retrieved on Oct. 3, 2021. Retrieved from the internet [URL: https://github.com/hyperledger/ursa ].

Partnership for DSCSA Governance, PDG, 2021, 3 pages. Retrieved on Oct. 3, 2021. Retrieved from the internet [URL: https://dscsagovernance.org/ ].

Housley et. al., Trust Anchor Format, Internet Engineering Task Force (IETF), dated Jun. 2021, 14 pages. Retrieved on Oct. 3, 2021. Retrieved from the internet [URL: https://datatracker.ietf.org/doc/html/rfc5914 ].

Thayer, "Why Does Mozilla Maintain Our Own Root Certificate Store?", Mozilla Security Blog, dated Feb. 14, 2019, 3 pages. Retrieved on Oct. 3, 2021. Retrieved from the internet [URL: https://blog.mozilla.org/security/2019/02/14/why-does-mozilla-maintain-our-own-root-certificate-store/ ].

Otto et. al., Verifiable Credentials Use Cases, W3C Working Group, dated Sep. 24, 2019, 35 pages. Retrieved on Oct. 3, 2021. Retrieved from the internet [URL: https://www.w3.org/TR/vc-use-cases/ ].

Entities, Spherity, 3 pages. Retrieved on Oct. 3, 2021. Retrieved from the internet [URL: https://docs.spherity.com/spherity-api/verifiable-credentials-api/entities ].

General Meeting Agenda—Healthcare SIG, Hyperledger Foundation, updated Feb. 17, 2021, 2 pages. Retrieved on Oct. 3, 2021. Retrieved from the internet [URL: https://wiki.hyperledger.org/display/HCSIG/2021.02.17+General+Meeting+Agenda ].

Google Protocol Buffers—Google's data interchange format, Github, dated 2008, 6 pages. Retrieved on Oct. 3, 2021. Retrieved from the internet [URL: https://github.com/protocolbuffers/protobuf ].

Young, Verifiable Credentials Flavors Explained, COVID-19 Credentials Initiative, dated Feb. 2021, 21 pages. Retrieved on Oct. 3, 2021. Retrieved from the internet [URL: https://www.lfph.io/wp-content/uploads/2021/02/Verifiable-Credentials-Flavors-Explained.pdf ].

Dodds, Follow Your Nose, Linked Data Patterns, dated May 31, 2012, 2 pages. Retrieved on Oct. 3, 2021. Retrieved from the internet [URL: https://patterns.dataincubator.org/book/follow-your-nose.html ].

Searls, New Hope for Digital Identity, Linux Journal, dated Nov. 9, 2017, 7 pages. Retrieved on Oct. 4, 2021. Retrieved from the internet [URL: https://www.linuxjournal.com/content/new-hope-digital-identity ].

Temoshok et. al., Developing Trust Frameworks to Support Identity Federations, National Institute of Standards and Technology (NIST), dated Jan. 2018, 34 pages. Retrieved on Oct. 4, 2021. Retrieved from the internet [URL: http://dx.doi.org/10.6028/NIST.IR.8149 ].

Makaay et. al., Frameworks for Identity Systems, Open Identity Exchange (OIX), dated Jun. 2017, 18 pages. Retrieved on Oct. 5, 2021. Retrieved from the internet [URL: https://connectis.com/wp-content/uploads/2018/05/OIX-White-Paper_Trust-Frameworks-for-Identity-Systems_Final.pdf ].

Web Assembly, Mozilla Developer Network (MDN), dated 2021, 31 pages. Retrieved on Oct. 5, 2021. Retrieved from the internet [URL: https://developer.mozilla.org/en-US/docs/WebAssembly ].

Rossberg, WebAssembly Core Specification, W3C Working Group, W3C, dated Dec. 5, 2019, 164 pages. Retrieved on Oct. 5, 2021. Retrieved from the internet [URL: https://www.w3.org/TR/wasm-core-1/ ].

Kaptjin et. al., X.509 DID method, WebOfTrustInfo, GitHub, dated Aug. 12, 2019, 6 pages. Retrieved on Oct. 5, 2021. Retrieved from the internet [URL: https://github.com/WebOfTrustInfo/rwot9-prague/blob/master/topics-and-advance-readings/X.509-DID-Method.md ].

Sovrin Governance Framework Working Group, Sovrin Governance Framework V2, Sovrin Foundation, dated Dec. 4, 2019, 20 pages. Retrieved on Oct. 5, 2021. Retrieved from the internet [URL: https://sovrin.org/wp-content/uploads/Sovrin-Governance-Framework-V2-Master-Document-V2.pdf ].

(56) References Cited

OTHER PUBLICATIONS

Callahan et. al., Six Principles for Self-Sovereign Biometrics, Web of Trust Info., GitHub, dated Oct. 6, 2019,7 pages. Retrieved on Oct. 5, 2021. Retrieved from the internet [URL: https://github.com/WebOfTrustInfo/rwot6-santabarbara/blob/master/draft-documents/Biometrics.md].
Rose et. al., Zero Trust Architecture, NIST Special Publication 800-207, dated Aug. 2020, 59 pages. Retrieved on Oct. 6, 2021. Retrieved from the internet [URL: https://csrc.nist.gov/publications/detail/sp/800-207/final ].
Identity-concept.svg, Wikimedia Commons, 3 pages. Retrieved on Oct. 6, 2021. Retrieved from the internet [URL: https://commons.wikimedia.org/wiki/File:Identity-concept.svg ].
Hardman, Verifiable Data Registry (Image), Wikipedia, dated Nov. 5, 2019, 1 page. Retrieved on Oct. 6, 2021. Retrieved from the internet [URL: https://en.wikipedia.org/wiki/Verifiable_credentials#/media/File:VC_triangle_of_Trust.svg ].
Bogdanov, Pseudorandom Functions: Three Decades Later, dated 2017, 72 pages. Retrieved on Oct. 6, 2021. Retrieved from the internet [URL: https://eprint.iacr.org/2017/652.pdf ].
Grassi et. al., Digital Identity Guidelines, NIST Special Publication 800-63-3, dated Jun. 2017, 75 pages. Retrieved on Oct. 6, 2021. Retrieved from the internet [URL: https://doi.org/10.6028/NIST.SP.800-63-3 ].
Grassi et. al., Digital Identity Guidelines: Authentication and Lifecycle Management, NIST Special Publication 800-63B, dated Jun. 2017, 79 pages. Retrieved on Oct. 6, 2021. Retrieved from the internet [URL: https://doi.org/10.6028/NIST.SP.800-63b ].
Grassi et. al., Digital Identity Guidelines: Federation and Assertions, NIST Special Publication 800-63C, dated Jun. 2017, 49 pages. Retrieved on Oct. 6, 2021. Retrieved from the internet [URL: https://doi.org/10.6028/NIST.SP.800-63c ].
Untitled code sample, W3C Working Group, W3C, dated 2018, 7 pages. Retrieved on Oct. 6, 2021. Retrieved from the internet [URL: https://www.w3.org/2018/credentials/v1 ].
DIF—Decentralized Identity Foundation, Homepage, dated 2021, 8 pages. Retrieved on Oct. 6, 2021. Retrieved from the internet [URL: https://identity.foundation/ ].
PharmaCompass, Top 1000 Global Pharmaceutical Companies, LePro PharmaCompass OPC, dated Sep. 2020, 101 pages. Retrieved on Oct. 6, 2021. Retrieved from the internet [URL: https://www.pharmacompass.com/data-compilation/top-1000-global-pharmaceutical-companies ].
How to share an OpenPGP public key easily in three steps, Mailfence, dated Jul. 11, 2017, 14 pages. Retrieved on Aug. 13, 2021. Retrieved from the internet [URL: https://blog.mailfence.com/openpgp-public-key/ ].
U.S. Appl. No. 17/492,488—Office Action dated Aug. 17, 2022, 25 pages.
U.S. Appl. No. 17/982,518, filed Nov. 7, 2022, Pending.
U.S. Appl. No. 17/982,507, filed Nov. 7, 2022, Pending.
U.S. Appl. No. 17/982,513, filed Nov. 7, 2022, Pending.
Abid et al., Block-Chain Security Advancement in Medical Sector for sharing Medical Records, 2019 International Conference on Innovative Computing (ICIC) (Year: 2019).
Rahman et al., Blockchain Based Mobile Edge Computing Framework for Secure Therapy Applications, 2018, IEEE Special Section on Mobile Multimedia for Healthcare, vol. 6, pp. 72469-72478 (Year: 2018).
Grassi et. al., NIST Special Publication 800-63C, Digital Identity Guidelines—Federation and Assertions, retrieved on Oct. 1, 2021, 48 pages. Retrieved from [ URL: https://pages.nist.gov/800-63-3/sp800-63c.html ].
Drug Supply Chain Security Act (DSCSA), Food and Drug Administration (FDA), retrieved on Oct. 1, 2021, 3 pages. Retrieved from [URL: https://www.fda.gov/drugs/drug-supply-chain-integrity/drug-supply-chain-security-act-dscsa ].
Callahan, Council Post: Know Your Customer (KYC) Will Be a Great Thing When It Works, Forbes, dated Jul. 10, 2018, 8 pages. Retrieved on Oct. 1, 2021. Retrieved from [URL: https://www.forbes.com/sites/forbestechcouncil/2018/07/10/know-your-customer-kyc-will-be-a-great-thing-when-it-works/?sh=722a21178dbb ].
U.S. Department of Health and Human Services Food and Drug Administration, Identifying Trading Partners Under the Drug Supply Chain Security Act: Guidance for Industry—Draft Guidance, Aug. 2017, 18 pages. Retrieved on Oct. 1, 2021. Retrieved from the internet [URL: https://www.fda.gov/files/drugs/published/Identifying-Trading-Partners-Under-the-Drug-Supply-Chain-Security-Act-Guidance-for-Industry.pdf ].
U.S. Food and Drug Administration, Drug Supply Chain Security Act Law and Policies, U.S. Department of Health and Human Services Food and Drug Administration, updated Oct. 23, 2020, 6 pages. Retrieved on Oct. 1, 2021. Retrieved from the internet [URL: https://www.fda.gov/drugs/drug-supply-chain-security-act-dscsa/drug-supply-chain-security-act-law-and-policies].
Freisleben, VRS Updates: Past, Present and Future, dated Dec. 12, 2018, Healthcare Distribution Alliance (HDA), 6 pages. Retrieved on Oct. 1, 2021. Retrieved from the internet [URL: https://www.hda.org/news/hda-blog/2018/12/07/14/44/2018-12-12-vrs-update-past-present-future ].
GS1 Healthcare U.S. Standard 1.1—Applying the GS1 Lightweight Messaging Standard for DSCSA Verification of Returned Product Identifiers, dated Mar. 31, 2020, 60 pages. Retrieved on Oct. 1, 2021. Retrieved from the Internet [URL: https://www.gs1us.org/DesktopModules/Bring2mind/DMX/Download.aspx?Command=Core_Download&EntryId=1897&language=en-US&PortalId=0&TabId=134 ].
Jurgens, Industry-wide DSCSA Compliance Pilot Successfully Completed, Spherity, dated Dec. 17, 2020, 15 pages. Retrieved on Oct. 1, 2021. Retrieved from the internet [URL: https://medium.com/spherity/industry-wide-dscsa-compliance-pilot-successfully-completed-d7223a0f2c92 ].
XATP Working Group, Framework for extended ATP Authentication, Enhanced Verification and Saleable Returns Documentation, LedgerDomain, dated Dec. 17, 2020, 25 pages. Retrieved on Oct. 1, 2021. Retrieved from the internet [URL: https://www.xatp.org/publications ].
Chadwick et. al., Verifiable Credentials Data Model 1.0: Expressing verifiable information on the Web, World Wide Web Consortium (W3C), dated Nov. 19, 2019, 68 pages. Retrieved on Oct. 1, 2021. Retrieved from the internet [URL: https://www.w3.org/TR/vc-data-model/ ].
GS1 Healthcare U.S., Assessing Current Implementation of DSCSA Serialization Requirements, GS1 US, dated 2018, 6 pages. Retrieved on Oct. 2, 2021. Retrieved from the internet [URL: https://www.gs1us.org/DesktopModules/Bring2mind/DMX/Download.aspx?Command=Core_Download&EntryId=1210&language=en-US&PortalId=0&TabId=134 ].
GS1 U.S., DSCSA Pilot Project readiness results, PDG FDA Pilot Program Round—Robin Webinar Series, dated Jun. 30, 2020, slides 16-29. Retrieved on Oct. 2, 2021. Retrieved from the internet [URL: : https://dscsagovernance.org/wp-content/uploads/2020/08/Attachment-A-Presentations.pdf ].
U.S. Department of Health and Human Services Food and Drug Administration, Verification Systems Under the Frug Supply Chain Security Act for Certain Prescription Drugs, Guidance for Industry, Draft Guidance, dated Oct. 2018, 14 pages. Retrieved on Oct. 2, 2021. Retrieved from the internet [URL: https://www.fda.gov/media/117950/download ].
GS1 Healthcare U.S., Standard 1.2, Applying GS1 Standards for DSCSA and Traceability, dated Nov. 7, 2016, 126 pages. Retreived on Oct. 2, 2021. Retrieved from the internet [URL: https://www.gs1us.org/DesktopModules/Bring2mind/DMX/Download.aspx?Command=Core_Download&EntryId=749&language=en-US&PortalId=0&TabId=134 ].
GS1 Healthcare U.S., GS1 Lightweight Messaging Standard for Verification of Product Identifiers, dated Dec. 2018, 30 pages. Retrieved on Oct. 2, 2021. Retrieved from the internet [URL: https://www.gs1.org/docs/epc/GS1_Lightweight_Verification_Messaging_Standard.pdf ].
U.S. Department of Health and Human Services Food and Drug Administration, Wholesale Distributor Verification Requirement for Saleable Returned Drug Product and Dispenser Verification Require-

(56) References Cited

OTHER PUBLICATIONS ments When Investigating a Suspect or Illegitimate Product—Compliance Policies, Guidance for Industry, dated Oct. 2020, 10 pages. Retrieved on Oct. 2, 2021. Retrieved from the internet [URL: https://www.fda.gov/media/131005/download ].

DSCSA Pilot Project Program, Food and Drug Administration (FDA), updated May 22, 2019, 4 pages. Retrieved on Oct. 2, 2021. Retrieved from the internet [URL: https://www.fda.gov/drugs/drug-supply-chain-security-act-dscsa/dscsa-pilot-project-program ].

Chien et. al., The Last Mile: DSCSA Solution Through Blockchain Technology: Drug Tracking, Tracing and Verification at the Last Mile of the Pharmaceutical Supply Chain with BRUINchain, Blockchain in Healthcare Today, dated Mar. 12, 2020, 28 pages. Retrieved on Oct. 2, 2021. Retrieved from the internet [URL: https://blockchainhealthcaretoday.com/index.php/journal/article/view/134 ].

Androulaki et. al., Hyperledger Fabric: A distributed operating system for permissioned blockchains, Proceedings for EuroSys 2018 Conference, revised Apr. 17, 2018, 15 pages. Retrieved on Oct. 2, 2021. Retrieved from the internet [URL: https://arxiv.org/abs/1801.10228 ].

Gabay, Federal Controlled Substances Act: Ordering and Recordkeeping, Hospital Pharmacy, dated Dec. 9, 2013, 3 pages. Retrieved on Oct. 2, 2021. Retrieved from the internet [URL: https://www.ncbi.nlm.nih.gov/pmc/articles/PMC3875106/ ].

Federal Trade Commission, Federal Law Requires All Businesses to Truncate Credit Card Information on Receipts, Federal Trade Commission (FTC), dated May 2007, 3 pages. Retrieved on Oct. 2, 2021. Retrieved from the internet [URL: https://www.ftc.gov/tips-advice/business-center/guidance/slip-showing-federal-law-requires-all-businesses-truncate ].

Matney, Apple's global active install base of iPhones surpassed 900 million this quarter, TechCrunch, dated Jan. 29, 2019, 2 pages. Retrieved on Oct. 2, 2021. Retrieved from the internet [URL: https://techcrunch.com/2019/01/29/apples-global-active-install-base-of-iphones-surpassed-900-million-this-quarter/ ].

Shuaib et. al., Blockchains for Secure Digitized Medicine, Journal of Personalized Medicine, dated Jul. 13, 2019, 9(3): 35, 21 pages. Retrieved on Oct. 2, 2021. Retrieved from the internet [URL: https://www.mdpi.com/2075-4426/9/3/35 ].

Brook, "What's the Cost of a Data Breach in 2019?", Data Insider—Digital Guardian, dated Dec. 1, 2020, 8 pages. Retrieved on Oct. 2, 2021. Retrieved from the internet [URL: https://digitalguardian.com/blog/whats-cost-data-breach-2019 ].

Keen et. al., Forecasts Worldwide Information Security Spending to Exceed $124 Billion in 2019, Gartner, dated Aug. 15, 2018, 5 pages. Retrieved on Oct. 2, 2021. Retrieved from the internet [URL: https://www.gartner.com/en/newsroom/press-releases/2018-08-15-gartner-forecasts-worldwide-information-security-spending-to-exceed-124-billion-in-2019 ].

Ponemon, What's New in the 2019 Cost of a Data Breach Report, Security Intelligence, dated Jul. 23, 2019, 10 pages. Retrieved on Oct. 2, 2021. Retrieved from the internet [URL: https://securityintelligence.com/posts/whats-new-in-the-2019-cost-of-a-data-breach-report/ ].

Steel, Passwords Are Still a Problem According to the 2019 Verizon Data Breach Investigations Report, LastPass Blog, dated May 21, 2019, 4 pages. Retrieved on Oct. 2, 2021. Retrieved from the internet [URL: https://blog.lastpass.com/2019/05/passwords-still-problem-according-2019-verizon-data-breach-investigations-report/ ].

Lu, "How Much are Password Resets Costing Your Company?", Okta, dated Aug. 20, 2019, 2 pages. Retrieved on Oct. 2, 2021. Retrieved from the internet [URL: https://www.okta.com/blog/2019/08/how-much-are-password-resets-costing-your-company/ ].

Bourque, Ditching passwords and increasing e-commerce conversion rates by 54%, CIO, dated May 1, 2017, 4 pages. Retrieved on Oct. 2, 2021. Retrieved from the internet [URL: https://www.cio.com/article/3193206/ditching-passwords-and-increasing-ecommerce-conversion-rates-by-54.html ].

StClair et. al., Blockchain, Interoperability, and Self-Sovereign Identity: Trust Me, It's My Data, Blockchain in Healthcare Today, dated Jan. 6, 2020, 3 pages. Retrieved on Oct. 3, 2021. Retrieved from the internet [URL: https://blockchainhealthcaretoday.com/index.php/journal/article/view/122/144 ].

Heath, SolarWinds hack was 'largest and most sophisticated attack' ever—Microsoft president, Financial Post, dated Feb. 14, 2021, 3 pages. Retrieved on Oct. 3, 2021. Retrieved from the internet [URL: https://financialpost.com/pmn/business-pmn/solarwinds-hack-was-largest-and-most-sophisticated-attack-ever-microsoft-president ].

COVID-19 Credentials Initiative, Hello World from the COVID-19 Credentials Initiative, dated Jun. 25, 2020, 3 pages. Retrieved on Oct. 3, 2021. Retrieved from the internet [URL: https://cci-2020.medium.com/hello-world-from-the-covid-19-credentials-initiative-6d45534c4b3a ].

Bossert, I Was the Homeland Security Adviser to Trump. We're Being Hacked., The New York Times, dated Dec. 16, 2020, 3 pages. Retrieved on Oct. 3, 2021. Retrieved from the internet [URL: https://www.nytimes.com/2020/12/16/opinion/fireeye-solarwinds-russia-hack.html ].

Krebs, At Least 30,000 U.S. Organizations Newly Hacked via Holes in Microsoft's Email, Krebson Security, dated Mar. 5, 2021, 6 pages. Retrieved on Oct. 3, 2021. Retrieved from the internet. [URL: https://krebsonsecurity.com/2021/03/at-least-30000-u-s-organizations-newly-hacked-via-holes-in-microsofts-email-software/ ].

Newton, The battle inside Signal, The Verge, dated Jan. 25, 2021, 19 pages. Retrieved on Oct. 3, 2021. Retrieved from the internet. [URL: https://www.theverge.com/platform/amp/22249391/signal-app-abuse-messaging-employees-violence-misinformation ].

Tobin et. al., The Inevitable Rise of Self-Sovereign Identity, Sovrin Foundation Whitepaper, updated Mar. 28, 2017, 24 pages. Retrieved on Oct. 3, 2021. Retrieved from the internet [URL: https://sovrin.org/wp-content/uploads/2018/03/The-Inevitable-Rise-of-Self-Sovereign-Identity.pdf ].

Mitre, Broad Coalition of Health and Technology Industry Leaders Announce Vaccination Credential Initiative to Accelerate Digital Access to COVID-19 Vaccination Records, dated Jan. 14, 2021, 5 pages. Retrieved on Oct. 3, 2021. Retrieved from the internet [URL: https://www.businesswire.com/news/home/20210114005294/en/Broad-Coalition-of-Health-and-Technology-Industry-Leaders-Announce-Vaccination-Credential-Initiative-to-Accelerate-Digital-Access-to-COVID-19-Vaccination-Records ].

The Commons project, Unlocking the full potential of technology and data for the common good, 2019-2021, 5 pages. Retrieved on Oct. 3, 2021. Retrieved from the internet [URL: https://thecommonsproject.org/commonpass ].

What are Smart Health Cards?, Smart Health Cards Framework, 2021, 4 pages. Retrieved on Oct. 3, 2021. Retrieved from the internet [URL: https://smarthealth.cards/ ].

U.S. Department of Health and Human Services, Food and Drug Administration, Identifying Trading Partners Under the Drug Supply Chain Security Act, Guidance for Industry, dated Aug. 2017, 18 pages. Retrieved on Oct. 3, 2021. Retrieved from the internet [URL: https://www.fda.gov/files/drugs/published/Identifying-Trading-Partners-Under-the-Drug-Supply-Chain-Security-Act-Guidance-for-Industry.pdf ].

HDA Saleable Returns Pilot Study Identifies Two Recommendations to Meet 2019 DSCSA Requirements, Healthcare Distribution Alliance (HDA), dated Nov. 10, 2016, 5 pages. Retrieved on Oct. 3, 2021. Retrieved from the internet [URL: https://www.hda.org/news/2016-11-10-hda-pilot-results-revealed ].

FDA's Technology Modernization Action Plan (TMAP), Food and Drug Administration (FDA), dated Sep. 18, 2019, 10 pages. Retrieved on Oct. 3, 2021. Retrieved from the internet [URL: https://www.fda.gov/media/130883/download].

GS1 Standards Resources for DSCSA Implementation Support, GS1 US, dated Feb. 22, 2021, 7 pages. Retrieved on Oct. 3, 2021. Retrieved from the internet [URL: https://www.gs1us.org/industries/healthcare/standards-in-use/pharmaceutical/dscsa-resources ].

Ashkar et. al., Evaluation of Decentralized Verifiable Credentials to Authenticate Authorized Trading Partners and Verify Drug Provenance, Blockchain for Healthcare Today, dated Mar. 11, 2021, 14

(56) References Cited

OTHER PUBLICATIONS pages. Retrieved on Oct. 3, 2021. Retrieved from the internet [URL: https://blockchainhealthcaretoday.com/index.php/journal/article/view/168 ].

Sporny et. al., Verifiable Credentials Data Model 1.0, W3C Working Group. dated Nov. 19, 2019, 122 pages. Retrieved on Oct. 3, 2021. Retrieved from the internet [URL: https://www.w3.org/TR/vc-data-model/ ].

Reed et. al., What are Decentralized Identifiers (DIDs)?, Evernym on Slideshare, dated Sep. 30, 2019, 29 pages. Retrieved on Oct. 3, 2021. Retrieved from the internet [URL: https://www.slideshare.net/Evernym/what-are-decentralized-identifiers-dids ].

Object Management Group Issues Request for Information for Disposable Self-Sovereign Identity Standard, Object Management Group (OMG), dated Jan. 21, 2021, 3 pages. Retrieved on Oct. 3, 2021. Retrieved from the internet [URL: https://www.omg.org/news/releases/pr2021/01-21-21.htm ].

Lodder et. al., Sovrin DID Method Specification, Sovrin Foundation, dated Aug. 20, 2021, 16 pages. Retrieved on Oct. 3, 2021. Retrieved from the internet [URL: https://sovrin-foundation.github.io/sovrin/spec/did-method-spec-template.html ].

Hammi, M.T. et al., Apr. 2018. "BCTrust: A decentralized authentication blockchain-based mechanism". In 2018 IEEE wireless communications and networking conference (WCNC) (pp. 1-6). IEEE. (Year: 2018), in 6 pages.

Prabha, P. et al., 2020, December. Securing telecare medical information system with blockchain technology. In 2020 2nd International Conference on Advances in Computing, Communication Control and Networking (ICACCCN) (pp. 846-851). IEEE. (Year: 2020), in 6 pages.

U.S. Appl. No. 17/492,488, filed Oct. 1, 2021, Pending.
U.S. Appl. No. 17/982,518, filed Nov. 7, 2022, Allowed.
U.S. Appl. No. 17/982,507, filed Nov. 7, 2022, Allowed.
U.S. Appl. No. 17/982,513, filed Nov. 7, 2022, Allowed.

\* cited by examiner

US 11,736,290 B1

MANAGEMENT OF RECIPIENT CREDENTIALS LEVERAGING PRIVATE KEYS ON KEYSTORES READ BY PROVISIONED DEVICES

RELATED APPLICATION

This application is related to the following application which is incorporated by reference herein for all purposes:

U.S. Nonprovisional patent application Ser. No. 17/492,488, titled "Decentralized Identity Authentication Framework for Distributed Data," filed Oct. 1, 2021.

FIELD OF INVENTION

The technology disclosed relates generally to decentralized identity authentication and management in a network of computers and corresponding data processing methods and products implementing secure authentication of users and user credential claims for access to a distributed, permissioned data structure shareable among disparate enterprises. In particular, the technology disclosed relates to using security software technology to implement authentication and credentialing by a trusted party of a non-credentialed user, enabling controlled access to secure permissioned blockchain data distributed among disparate enterprise actors.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Contemporary mobile devices (e.g., smartphones, tablet computers, and wearable devices such as smartwatches, and integrated circuit cards) have incorporated significant advancements in sensing technologies such as camera quality, geolocation sensing, and biometric authentication. Sensing technologies within recent generations of mobile devices are frequently comparable in functionality to those of industry-standard devices used by an enterprise (such as a business, company, firm, venture, partnership, and many other collaborative entities) in operations ranging from supply chain management and employee training to point-of-sale transactions. The use of mobile devices for business operations is advantageous due to the familiarity of these devices to workers of diverse backgrounds and skill levels.

With great power comes great responsibility; as well as great potential for chaos. Workers are known for sharing passwords without authorization, and the problem compounds when devices can be shared with other workers. Further, the rise of the "gig" economy has created a new segment of the workforce—those with a "loose affiliation" to an enterprise or multiple, potentially competing, enterprises.

An opportunity arises for improving the provisioning of devices for use in the workplace, and controlling the management of access credentials granted to users of these provisioned devices.

BRIEF DESCRIPTION OF DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
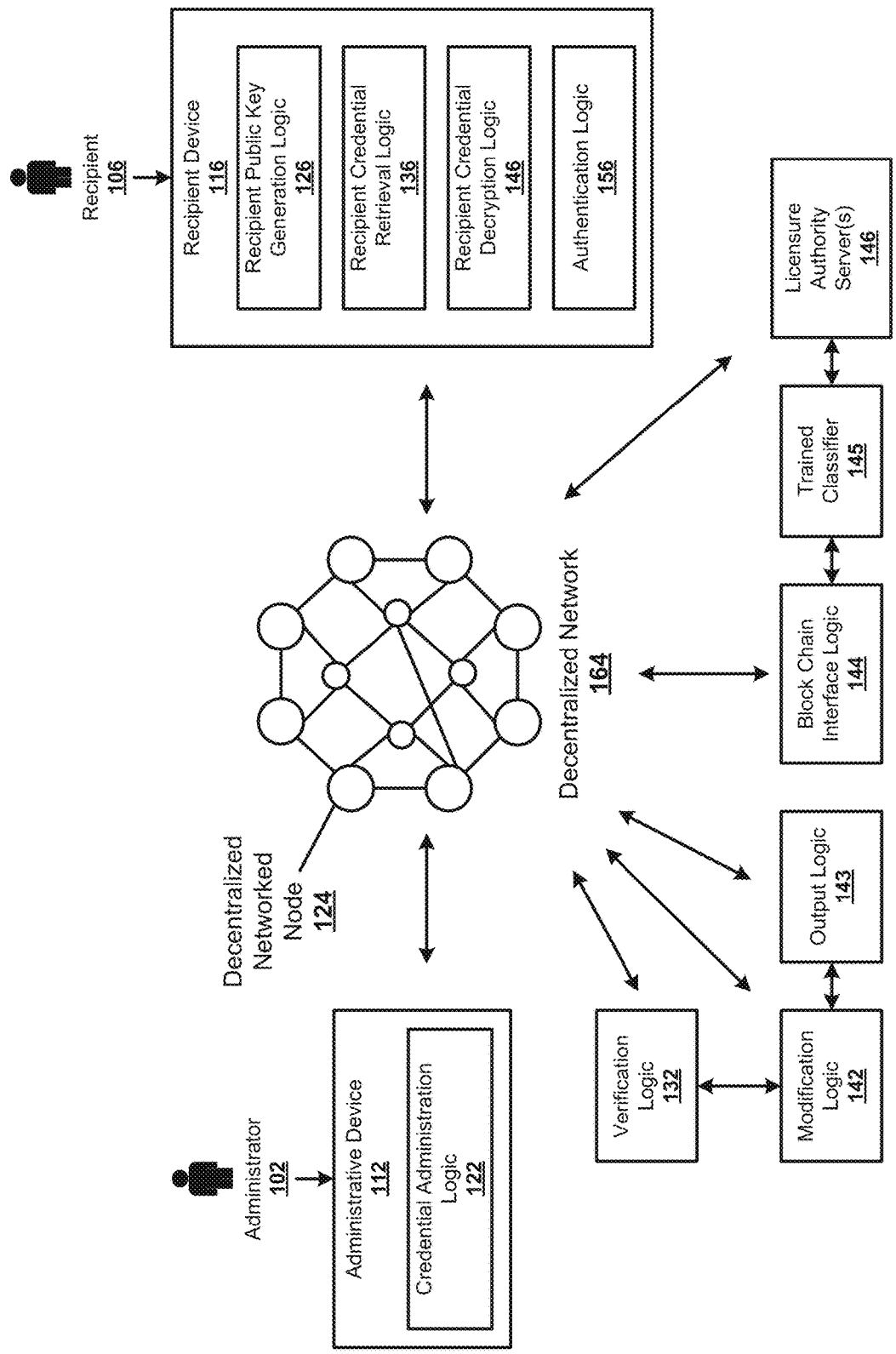
FIG. 1 shows an architectural level diagram of a system for access management leveraging private keys on single-tenant provisioned devices.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Introduction

In identity and access management (IAM) systems, identity can be established through workflows encompassing application, review, and provisioning. Enterprises may provision administrators with the ability to define user roles and access privileges, but this approach can create significant bottlenecks and review overhead. In many cases, a centralized IAM system may be insufficiently flexible or efficient to accommodate the needs of individuals within an enterprise. An administrator may wish to give an individual user credentials so that the individual can receive temporary or limited access to certain privileges without waiting for a third-person administrator to approve or sharing all of their user information and access with the individual (or with a third-party administrator). While the individual may be acting on the administrator's behalf, the actions must be logged and tracked separately with a high degree of certainty which person performed each particular action.

Many centralized systems (e.g., cloud-based file storage solutions) accommodate this requirement by allowing users to invite other users to access shared resources. However, this still requires that credentialing and access are centrally managed, and often leverages email-based communications, particularly when the two users are not part of the same organization. This creates a point of failure that is highly vulnerable to compromise by bad actors.

Moreover, mobile devices have also made possible the introduction of new cryptographic capabilities that enable users to retain their own private keys locally rather than in cloud storage. In contrast to retaining private keys in cloud-based repositories, locally-sequestered private keys prevent a single party from having comprehensive access to an enterprise's identity and access management (IAM) framework. Hence, in the event that enterprise servers are breached, attackers are unable to impersonate existing users, as they would not have access to any user private keys. Provisioning of so-called self-sovereign credentials and delegation of access privileges leveraging private keys on uniquely identifiable devices provides efficacious IAM solutions for a variety of enterprises such as healthcare organizations, financial institutions, and non-profit organizations. For example, in the pharmaceutical supply chain, access management and auditability requirements demand that each interaction with privileged systems must be traceable to a single individual user.

The technology disclosed comprises generating identity credentials involving two-factor authentication consisting of an application running on a uniquely identifiable device capable of accommodating a single user or a plurality of users, combined with uniquely identifiable keystores storing a user private key associated with respective individual users.

The disclosed system comprises an implementation for leveraging self-sovereign credentials held on mobile devices to provision credentials that empower one party ("recipient" or "user", used synonymously herein) to obtain credentialed access to information and resources on behalf of another party ("sender" or "administrator", used synonymously herein), without either party exposing private key information to each other or to the cloud. The sender is able to revoke user credentials at any time. The recipient can, under the terms of the smart contract, in some situations delegate some of their access privileges to a second recipient. Revocation of a recipient's authorization can in turn trigger revocation of any access authorities that recipient delegated to other recipients. Further, some delegations of authority can be evanescent, e.g., limited in duration by a passage of time or occurrence or absence of an event, after which the authority is no longer delegated. Parties are able to leverage commodity hardware to automatically mutually authenticate their credentials and access available relevant options and workflows.

In some implementations, self-sovereign credentials are sequestered locally to a uniquely identifiable user device, such as a smart phone or identity badge (e.g., radio frequency identification (RFID), near-field communication (NFC) tags, integrated circuit cards, Bluetooth-enabled mobile devices, and so on). Providing users with self-sovereign credentials enables the sharing of access to data in a way that does not require the use of insecure sharing mechanisms as a sole means of authentication (e.g., email or SMS), does not require centralized credential management, and enables the sender and recipient of access credentials to validate each other's identities and share permissioned access to sensitive systems and data with a high degree of confidence. Users on a common shared directory can share and delegate access without exposing private key information; such directories might be very large and encompass entire communities comprising multiple organizations. For users who are not on a common shared directory, the invention leverages widely available and commonly used commodity hardware combined with physical affordances to rapidly enable decentralized access delegation and secure communications.

Cloud-based user authentication often requires that plaintext passwords be exposed at time of login; while these passwords are hashed and salted, there are cases where the memory is not erased and therefore passwords remain vulnerable to bad actors. In the disclosed system, a private key may remain locally-stored on a single-tenant user device, or stored on a keystore read by a multi-tenant user device. In the multi-tenant user device use case, the private key only has a short, finite tenure on the multi-tenant user device after which all related sensitive material is wiped. In both the single-tenant and multi-tenant user device scenarios, private keys never reach the server; thus, if the server were breached, an attacker would be unable to impersonate an existing user. In the event of a compromise, the issuing party can issue revocations for a particular set of identity credentials without wiping out the entire public key registry. As a result, the likelihood of a major data breach is substantially decreased, avoiding the associated potential consequences ranging from clearing a severely compromised registry to undergoing years of cleanup and reconciliation.

Moreover, the technology disclosed implements a plurality of verification and "checks-and-balances" systems through additional engines within the IAM system for the verification of any access modification, as well as a connection to one or more servers to receive from a government or a private licensure authority, information including one or more of an approval, an issuance, a revocation, or a suspension, of a license, and a trained classifier to classify the information as to whether a change in privilege or status of a credentialled individual is indicated.

Architecture

FIG. 1 shows an architectural level diagram of a system 100 for runtime configuration of authentication journeys, according to one embodiment of the disclosed technology. Because FIG. 1 is an architectural diagram, certain details are intentionally omitted to improve clarity of the description. The discussion of FIG. 1 is organized as follows. First, the elements of the figure are described, followed by their interconnections. Then, the use of the elements in the system are described in greater detail.

System 100 includes an administrative device 112 accessible by an administrator 102, a decentralized network 164, and a recipient device 116 accessible by a recipient 106. Administrative device 112 comprises a credential administration logic 122. Recipient device 116 comprises a recipient public key generation logic 126, a recipient credential retrieval logic 136, a recipient credential decryption logic 146, and an authentication logic 156. Recipient device 116 may also be a workgroup device accessible by a plurality of recipients in certain implementations, wherein each recipient uses a keystore to securely access the workgroup device.

Administrative device 112 and recipient device 116 within system 100 interact with a decentralized network 164, wherein decentralized network 164 comprises a plurality of decentralized network nodes such as decentralized networked node 124. In some implementations of the technology disclosed, decentralized network 164 is a private permissioned blockchain data structure. In other implementations, decentralized network 164 is an alternative decentralized personal ledger data structure.

System 100 also has a verification logic 132, modification logic 142, and output logic 143, which all interact with each other as well as decentralized network 164. Finally, system 100 also includes a blockchain interface logic 144 that interacts with both decentralized 164 and a trained classifier 145. One or more servers 146 that communicate with licensure authorities (e.g., government or certification organizations) interact with decentralized network 164 and the trained classifier 145.

In the interconnection of the elements of system 100, communication may occur over one or more cloud servers. The communication path can be point-to-point over public and/or private networks. Communication can occur over a variety of networks, e.g., private networks, VPN, MPLS circuit, or Internet, and can use appropriate application program interfaces (APIs) and data interchange formats, e.g., REST, JSON, XML, SOAP. The communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi, and WiMAX.

System 100A is configured to provision user credentials for access to a decentralized networked node 124 within decentralized network 164, to which access has been limited to users authorized by decentralized networked node 124.

Administrator 102 uses credential administration logic 122, running on administrative device 112, to receive from a recipient 106 seeking credentialling electronic presentation of one or more instances of electronic evidence personally identifying a recipient 106 or supporting any credentialling being sought and a keystore to hold access to any credentialling issued.

Functions of credential administration logic 122 are now discussed in further detail. Credential administration logic 122 is configured to issue a recipient credential being sought by generating a recipient private key and recipient public key upon receipt of approval of the electronic evidence, forwarding the recipient's user credential being sought comprising the recipient public key to one of a set of decentralized networked nodes 124 that share a decentralized network 164, expunging any copies of the user private key; and (iii) issuing to the keystore the user private key; thereby credentialling the user to exchange secure messages with a decentralized networked node 124 within decentralized network 164. The recipient private key is stored in a keystore of recipient 106, wherein the keystore may be recipient device 116 or an additional keystore (e.g., badge) read by recipient device 116. In some implementations, encryption and deployment of the user credential are implemented using a decentralized identity communication (DIDComm) messaging protocol, such that the DIDComm messaging protocol uses the administrative private key as a sender and the recipient public key as a recipient. The encrypted user credential is generated as a shared secret by executing an Elliptic Curve Diffie-Hellman (ECDH) key exchange protocol. The encrypted user credential is indexed on a key-value store, wherein the key-value store is stored on decentralized network 164. Credential administration logic 122 is configured to expunge any evidence personally identifying the user or supporting any credentialling being sought that is evanescent according to a limit of duration.

Administrative device 112, in some implementations, may also comprise additional logics responsible for creating a delegation of at least some of the authority to access a network node for a limited duration of time and to send the delegation to recipient 106, associated with the recipient credential. In these implementations, administrative device 112 is configured to generate a smart contract, a smart contract public-private key pair, and a user private key to invoke services. The user private key is stored in a keystore of recipient 106, wherein the keystore may be recipient device 116 or an additional keystore (e.g., badge) read by recipient device 116. Administrative device 112 generates an access credential for recipient 106, wherein the access credential includes the recipient public key, the smart contract public key, and the smart contract. Administrative device 112 encrypts the access credential using the smart contract private key, generating an encrypted access credential.

Administrative device 112 deploys the encrypted access credential such that the encrypted access credential is retrievable by recipient 106 using the recipient public key, decryptable by the recipient using the recipient private key, and revocable by administrator 102 using the smart contract private key. In some implementations, encryption and deployment of the access credential are implemented using a decentralized identity communication (DIDComm) messaging protocol, such that the DIDComm messaging protocol uses the smart contract private key as a sender and the recipient public key as a recipient. The encrypted access credential is generated as a shared secret by executing an Elliptic Curve Diffie-Hellman (ECDH) key exchange protocol. The encrypted access credential is indexed on a key-value store, wherein the key-value store is stored on decentralized network 164.

To access the encrypted user credential or an encrypted access credential, recipient public key generation logic 126, running on recipient device 116, generates the recipient public key based on the recipient private key using an elliptic curve cryptography function. In some implementations of the disclosed system, the recipient private key is stored locally on the recipient device 116. In other implementations, the recipient private key is stored locally on a keystore read by the recipient device 116. Recipient credential retrieval logic 136, also running on recipient device 116, uses the recipient public key generated by recipient public key generation logic 126 to query the key-value store for the encrypted credential and receive the encrypted credential from the key-value store, using DIDComm messaging protocol and ECDH key exchange. Recipient credential decryption logic 146, running on recipient device 116, decrypts the encrypted credential using the recipient private key, generating a decrypted credential. Authentication logic 156, running on recipient device 116, authenticates the recipient 106 using the decrypted credential when the recipient seeks authentication to a particular application running on the recipient device, such that the particular application accesses a network node to which access has been limited to users authorized by decentralized network node 124.

In response to recipient 106 requesting authentication via authentication logic 156, verification logic 132 is configured to search nodes of decentralized network 164, to obtain information indicating a change in privilege or status is warranted for the decrypted user credential. If a change is warranted, in response to communication with verification logic 132, modification logic 142 is configured to change a property of the decrypted user credential when the information indicating a change in privilege or status is warranted is found; wherein a change in property limits access to services provided by decentralized network 164, to which access has been limited to users authorized by one of the set of decentralized networked nodes 124. Following modification of the decrypted user credential in response to a change in privilege or status for recipient 106, output logic 143 is configured to communicate to other decentralized nodes a command to at least one of pause an action, limit an amount associated with an action, and deny an action, due to the change in privilege or status.

Decentralized network 164 is further configured to receive verification from a connection to one or more servers 146 to receive from a government or a private licensure authority, information including one or more of an approval, an issuance, a revocation, or a suspension, of a license. Information obtained from servers 146 is processed as input by trained classifier 145 to generate an output classifying the information as to whether a change in privilege or status of a credentialled individual is indicated. In response to the output from trained classifier 145, block chain interface logic 144 is configured to create a node on the decentralized network 164, the node including information indicating a change in privilege or status is warranted.

Further continuing with the description of the system 100, components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Decentralized Issuance of User Credentials

To elaborate further on the interconnectedness of the components of system 100, respectively, a series of message flow diagrams are now described for the provisioning of user credentials leveraging private keys stored locally on provisioned devices.

Figure 2A:
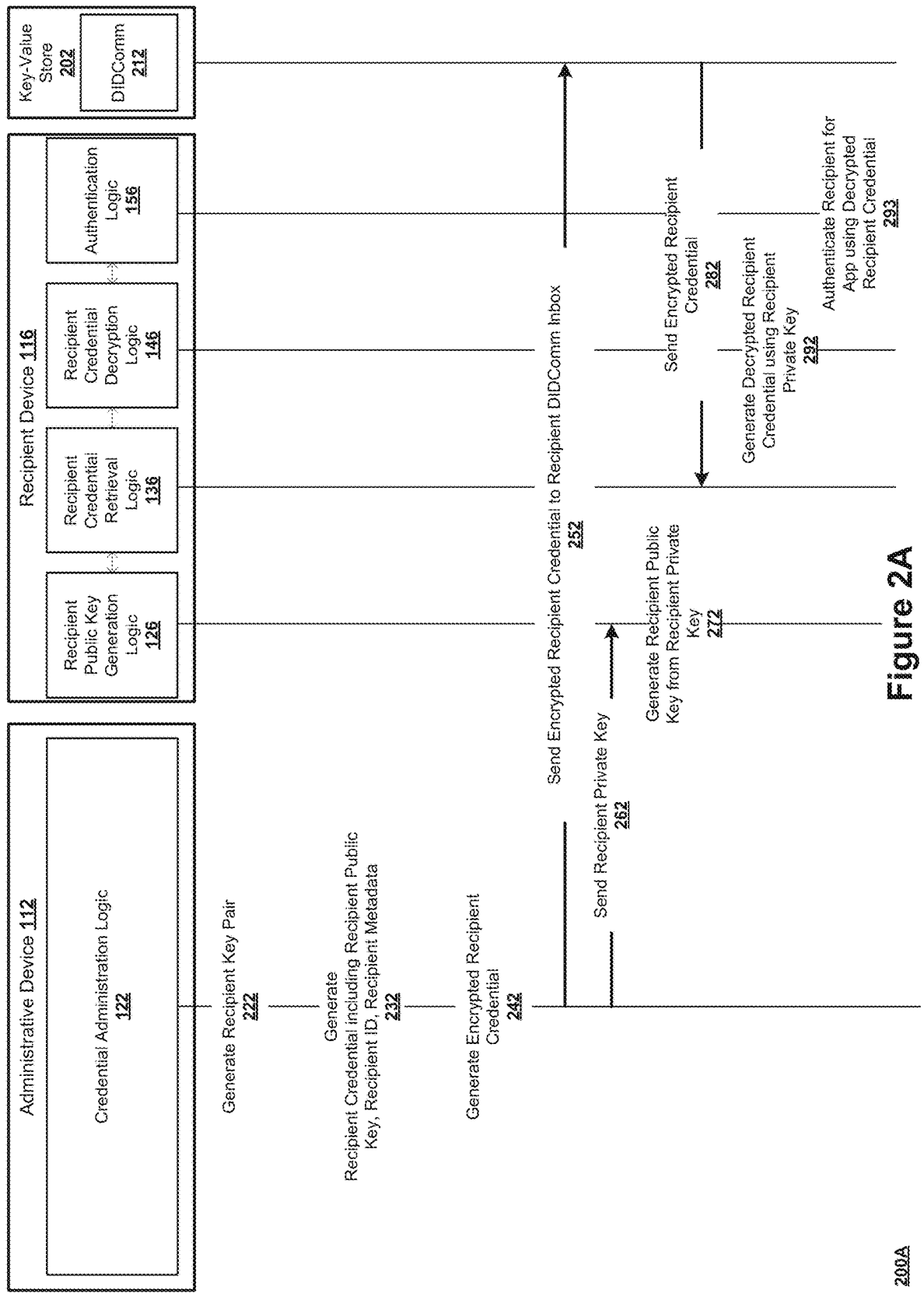
FIG. 2A shows a message flow diagram for user credentialing leveraging a private key stored on a provisioned device.

FIG. 2A shows a message flow diagram 200A for user credentialing wherein a recipient device is used by a single recipient. An administrative device 112 (including a credential administration logic 122) and a recipient device 116 (including a recipient public key generation logic 126, recipient credential retrieval logic 136, recipient credential decryption logic 146, and authentication logic 156) interact with a key-value store 202 that comprises a DIDComm messaging protocol 212, wherein recipients have recipient public key-indexed DIDComm Inboxes to and from which user credentials or access credentials may be transmitted.

Double-sided arrows in between recipient public key generation logic 126, access credential retrieval logic 136, access credential decryption logic 146, and authentication logic 156 indicate data communication between these logics, and it is to be understood that for diagram clarity, data and information generated by a particular logic component within recipient device 116 are accessible to other logic components within recipient device 116.

For an administrator intending to provision credentials to a particular recipient, step 222 involves the credential administration logic 122 generating a recipient public-private key pair. Next, in step 232, credential administration logic 122 generates a recipient credential comprising the recipient public key, recipient ID (e.g., a username, identification number, email address, or cell phone number), and additional recipient metadata that may correspond to the recipient's clearance level, role, organization, and qualifications.

In step 242, the generated recipient credential is encrypted by credential administration logic 122 using the administrative private key and recipient public key. The encrypted recipient credential is sent by credential administration logic 122 to the recipient's DIDComm inbox in step 252. In many implementations, encryption and transmission of the recipient credential use DIDComm messaging protocol and ECDH key exchange.

In some implementations, the administrative private key used for encryption is an ephemeral administrative private key such that the private key is produced for ECDH exchange, and then the administrator authenticates separately by ECDSA-signing using the administrator's credential private key (where the administrator credential private key is a long-lived private key and different from the ephemeral key). Within a XATP implementation, an ephemeral administrative private key is generated, but the credential itself possesses all of the necessary content and thus no signature is necessary. Because the recipient private key to be stored on recipient device 116 is sufficient to decrypt the encrypted recipient credential, the ephemeral administrative private key is deleted following the single-use of encrypting the recipient credential. The key-value store 202 will store the encrypted recipient credential indexed by the recipient public key, where it is retrievable by the recipient via the recipient private key.

Next, in step 262, the credential administration logic 122 transmits the recipient private key to the recipient device 116. Following steps 252 and 262, the recipient key pair, recipient credential, and ephemeral administrative private key are erased from the administrative device (e.g., administrative device 112) for privacy protection.

Once the encrypted recipient credential is stored in the recipient's DIDComm inbox 212, it can be accessed by the recipient device 116 using the recipient private key. This may be triggered by a notification sent by the decentralized network 164 to the recipient via recipient device 116 notifications or other forms of communication such as email, telephone, or supervisor confirmation, or triggered by the recipient requesting to check for this information using recipient device 116. To retrieve the encrypted recipient credential, the recipient public key is necessary to query the key-value store 202. In step 272, the recipient public key generation logic 126 generates the recipient public key from the recipient private key, so that the recipient private key may be used by the recipient credential retrieval logic 136 to request the encrypted recipient credential from key-value store 202. Key-value store 202 sends the encrypted recipient credential via DIDComm 212 protocol in step 282. In step 292, recipient credential decryption logic 146 generates the decrypted recipient credential using the recipient private key. Finally, once the recipient credential has been decrypted, it can be used by authentication logic 156 in step 293 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

In many scenarios, the use of a shared directory such as key-value store 202 is not feasible or efficient. Some complex operational environments may involve different levels of credentials with large numbers of employees in different departments and locations, therefore a single directory would be unwieldy. Other operations might involve users from different organizations that do not share a common ledger, such as external auditors or partner organizations. Many real-world use cases for the disclosed systems involve a credentialed user who wishes to share access with an uncredentialed user.

In these use cases, the sender needs the recipient to have a device credential to which access can be delegated, and the device credential needs to be discoverable by the sender. Communication channels such as email and SMS involve significant security vulnerabilities. Alternatively, near-range communication between devices, such as those previously described for recipient keystore hardware devices, offers a way for a user to be credentialed without sharing of private keys or other sensitive information. Devices for close-range communication of access credentials may involve any combination of computers, mobile phones, RFID/NFC technology, hardware wallets, or any other pair of devices capable of locally exchanging information.

In an embodiment of the disclosed system that does not use key-value store 202 for credential exchange, a sender (i.e., administrator 102) has a device (i.e., administrative device 112) with an application leveraging an onboard private key that is generated at the time that the application is downloaded. The onboard private key (which may be referred to as a "device credential" herein) is independent from any other keys or identity credentials that may be held on the device, such as the user credential of administrator 102. The recipient uses a device that also possesses an application (wherein the application is the same application on administrative device 112, a similar or corresponding application to that on administrative device 112, or a distinct-but-related application to that on administrative device 112) leveraging a separate onboard private key generated at the time that the application was downloaded. The onboard private key or device credential is independent from any other keys or identity credentials that may be held on the device and is not equivalent to a user credential for the recipient.

The sender's device requests the public key of the recipient device (alternatively, the transaction may be initiated by the sender and recipient together as compared to initiated by the sender alone) and the recipient device provides the public key through a localized method of information exchange. The localized method of information exchange bypasses server channels; hence, no private key information is shared with the cloud. The sender is presented with a plurality of smart contract options and selects one or more options including smart contract conditions and limitations. Upon generation of the smart contract, a smart contract public-private key pair is also generated. In one implementation of the technology disclosed, such as a scenario in which the recipient's role within the enterprise is limited, the smart contract is included in an encrypted access credential along with the smart contract public key and the recipient device's public key. In another implementation of the technology disclosed, such as a scenario in which the recipient's role within the enterprise is on-going and the recipient requires issuance of credentials, access delegation logic 122 generates a recipient credential at the same time as the access credential. Thus, a new private key is set up for the recipient and transmitted onto the recipient device using close-range communication. The access credential will contain the smart contract public key, the newly-generated recipient public key, and the smart contract.

As previously described in the description of diagrams 200A, the encrypted credential is stored on the key-value store and can be accessed by the recipient device at any time. The recipient device uses its device credentials to access the appropriate DIDComm inbox and receive the encrypted credential, which is decrypted using the appropriate private key (either the device private key or the newly-generated recipient private key) and the recipient can be authenticated using the decrypted credential.

Figure 2B:
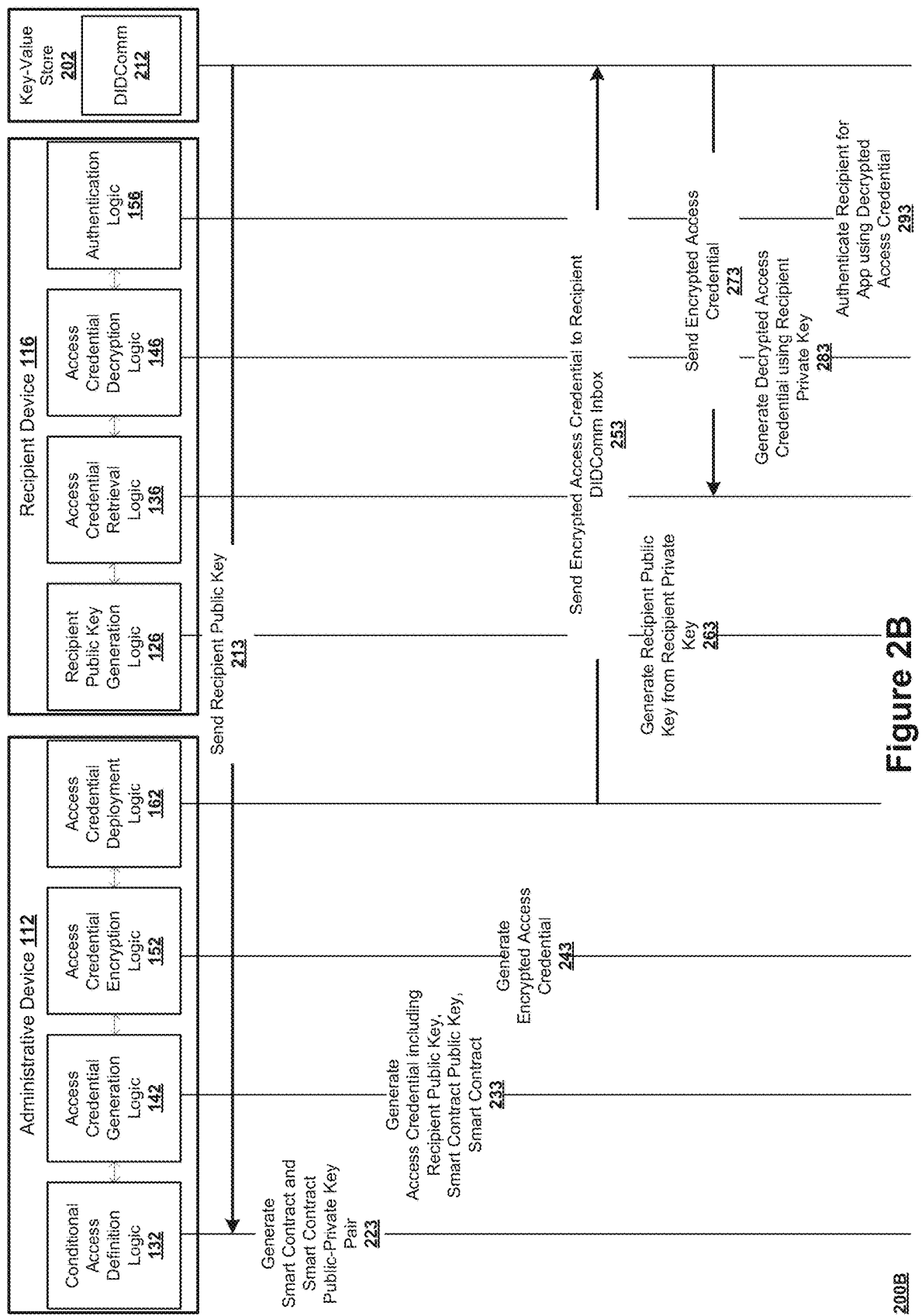
FIG. 2B shows a message flow diagram for access delegation leveraging a private key stored on a provisioned device.

Once a user has been provisioned credentials that can be accessed within key-value store 202, administrator 102 is able to look up the recipient within the key-value store 202 to delegate new access privileges to the recipient. FIG. 2B describes an example message flow diagrams for the delegation of access privileges to a recipient.

Decentralized Delegation of Access Credentials

FIG. 2B shows a message flow diagram 200B for access delegation leveraging a private key stored on a single-tenant provisioned device. Diagram 200B comprises an administrative device 112, a recipient device 116, and a key-value store 202. Administrative device 112 is configured to run components of access delegation logic 122: a conditional access definition logic 132, an access credential generation logic 142, an access credential encryption logic 152, and an access credential deployment logic 162. Double-sided arrows in between condition access definition logic 132, access credential generation logic 142, access credential encryption logic 152, and access credential deployment logic 162 indicate data communication between these logics, and it is to be understood that for diagram clarity, data and information generated by a particular logic component within access delegation logic 122 are accessible to other logic components within access delegation logic 122.

Recipient device 116 is configured to run a recipient public key generation logic 126, an access credential retrieval logic 136, an access credential decryption logic 146, and an authentication logic 156. Double-sided arrows in between recipient public key generation logic 126, access credential retrieval logic 136, access credential decryption logic 146, and authentication logic 156 indicate data communication between these logics, and it is to be understood that for diagram clarity, data and information generated by a particular logic component within recipient device 116 are accessible to other logic components within recipient device 116.

Key-value store 202 comprises a DIDComm messaging protocol 212, wherein recipients have recipient public key-indexed DIDComm Inboxes to and from which user credentials and access credentials may be transmitted. If an administrator intends to delegate an access privilege to a particular recipient, the recipient public key may be identified within key-value store 202 and sent to administrative device 112, as in step 213. Following step 213, step 223 involves the conditional access definition logic 132 generating a smart contract comprising one or more smart contract conditions, in which a smart contract condition defines an access limitation. Along with the generation of a smart contract, step 223 also generates a public-private key pair for the smart contract. In step 233, access credential generation logic 142 generates an access credential comprising the recipient public key, smart contract public key, and the smart contract.

In step 243, the generated access credential is encrypted using the smart contract private key and recipient public key by access credential encryption logic 152. Access credential deployment logic 162 sends the encrypted access credential to the recipient's DIDComm inbox in step 253. In many implementations, encryption and transmission of the access credential use DIDComm messaging protocol and ECDH key exchange, as previously described for transmission of user credentials within system 200A. Again, the smart contract private key used during encryption may be an ephemeral key.

Once the encrypted access credential is stored in the recipient's DIDComm inbox 212, it can be accessed by the recipient device 116 using the recipient private key. This may be triggered by a notification sent by the decentralized network 164 to the recipient via recipient device 116 notifications or other forms of communication such as email, telephone, or supervisor confirmation, or triggered by the recipient requesting to check for this information using recipient device 116. To retrieve the encrypted access credential, the recipient public key is necessary to query the key-value store 202. In step 263, the recipient public key generation logic 126 generates the recipient public key from the recipient private key, so that the recipient private key may be used by the access credential retrieval logic 136 to request the encrypted access credential from key-value store 202. Key-value store 202 sends the encrypted access credential via DIDComm 212 protocol in step 273. In step 283, access credential decryption logic 146 generates the decrypted access credential using the recipient private key.

Finally, once the access credential has been decrypted, it can be used by authentication logic 156 in step 293 to authenticate the recipient for an application, decentralized application ("DApp"), permissioned function, or authority to access a network node to invoke services that conduct operations using decentralized network 164 to which access has been limited to users authorized by one of the decentralized networked nodes, such as decentralized network node 124.

In other implementations, the recipient to be credentialed is not within a centralized database such that the recipient does not already have a provisioned public/private key pair and the recipient public key is not discoverable to the administrator 102 using the key-value store 202. In many scenarios, the use of a shared directory is not feasible or efficient. Some complex operational environments may involve different levels of credentials with large numbers of employees in different departments and locations, therefore a single directory would be unwieldy. Other operations might involve users from different organizations that do not share a common ledger, such as external auditors or partner organizations. Many real-world use cases for the disclosed systems involve a credentialed user who wishes to share access with an uncredentialed user.

In these use cases, the sender needs the recipient to have a device credential to which access can be delegated, and the device credential needs to be discoverable by the sender. Communication channels such as email and SMS involve significant security vulnerabilities. Alternatively, near-range communication between devices, such as those previously described for recipient keystore hardware devices, offers a way for access to be delegated without sharing of private keys or other sensitive information. Devices for close-range communication of access credentials may involve any combination of computers, mobile phones, RFID/NFC technology, hardware wallets, or any other pair of devices capable of locally exchanging information.

In an embodiment of the disclosed system that does not use key-value store 202 for credential exchange, a sender (i.e., administrator 102) has a device (i.e., administrative device 112) with an application leveraging an onboard private key that is generated at the time that the application is downloaded. The onboard private key (which may be referred to as a "device credential" herein) is independent from any other keys or identity credentials that may be held on the device, such as the user credential of administrator 102. The recipient uses a device that also possesses an application (wherein the application is the same application on administrative device 112, a similar or corresponding application to that on administrative device 112, or a distinct-but-related application to that on administrative device 112) leveraging a separate onboard private key generated at the time that the application was downloaded. The onboard private key or device credential is independent from any other keys or identity credentials that may be held on the device and is not equivalent to a user credential for the recipient.

The sender's device requests the public key of the recipient device (alternatively, the transaction may be initiated by the sender and recipient together as compared to initiated by the sender alone) and the recipient device provides the public key through a localized method of information exchange. The localized method of information exchange bypasses server channels; hence, no private key information is shared with the cloud. The sender is presented with a plurality of smart contract options and selects one or more options including smart contract conditions and limitations.

Upon generation of the smart contract, a smart contract public-private key pair is also generated. In one implementation of the technology disclosed, such as a scenario in which the recipient's role within the enterprise is limited, the smart contract is included in an encrypted access credential along with the smart contract public key and the recipient device's public key. In another implementation of the technology disclosed, such as a scenario in which the recipient's role within the enterprise is on-going and the recipient requires issuance of credentials, access delegation logic 122 generates a recipient credential at the same time as the access credential. Thus, a new private key is set up for the recipient and transmitted onto the recipient device using close-range communication. The access credential will contain the smart contract public key, the newly-generated recipient public key, and the smart contract.

As described in the description of diagrams 200A and 200B, the encrypted credential is stored on the key-value store and can be accessed by the recipient device at any time. The recipient device uses its device credentials to access the appropriate DIDComm inbox and receive the encrypted credential, which is decrypted using the appropriate private key (either the device private key or the newly-generated recipient private key) and the recipient can be authenticated using the decrypted credential.

Thus far, the discussion has addressed that a recipient private key may be stored on a mobile device, such as a smartphone, or on a keystore, such as an RFID badge to be read by a device that may be single-tenant or multi-tenant. The message flow diagram in system 200B primarily focuses on embodiments in which a recipient private key is stored directly on a device that runs the application to which the user is requesting access. In contrast, other implementations comprise a workgroup device used by a plurality of recipients. In these implementations, the workgroup device must first obtain the recipient private key from the recipient keystore. Following authentication, the recipient private key, as well as any additional information associated with the recipient credential or any associated access credentials, are erased from the workgroup device.

Decentralized Management of User Credentials

The discussion now elaborates further on management of user credentials using the verification and confirmation processes previously described in the Application.

Figure 2C:
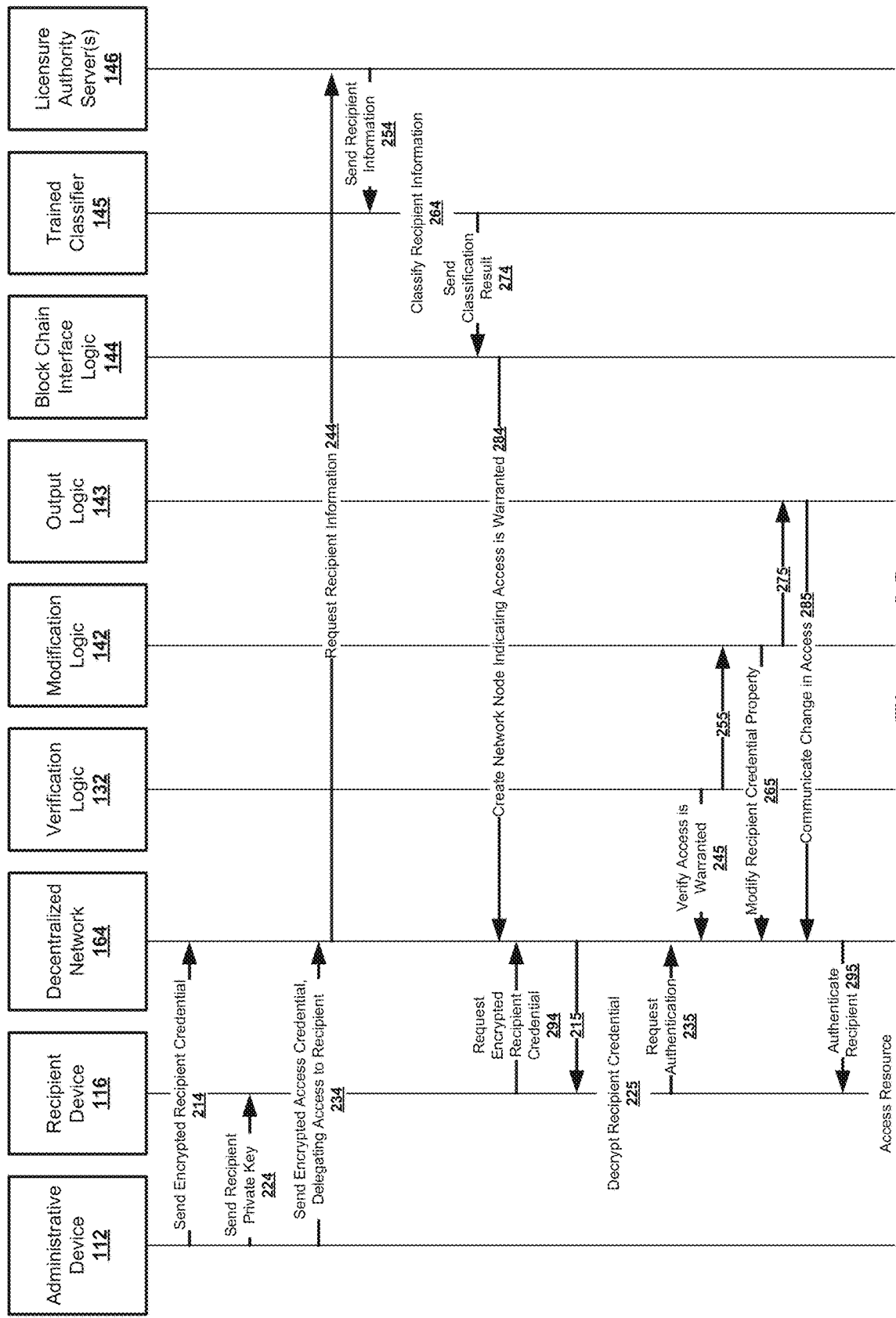
FIG. 2C shows a message flow diagram for user credential management leveraging a private key stored on a provisioned device, comprising successful authentication of a user.

FIG. 2C shows a message flow diagram 200C for user credential management leveraging a private key stored on a provisioned device, comprising successful authentication of a user. Diagram 200C comprises an administrative device 112, a recipient device 116, a decentralized network 164, verification 132, modification logic 142, output logic 143, block chain interface logic 144, trained classifier 145, and one or more licensure authority servers 146. Administrative device 112 issues recipient credentials for a recipient in step 214, storing an encrypted recipient credential in a key-value store indexed by the recipient public key within decentralized network 164. In step 224, administrative device 112 also sends the recipient private key to recipient device 116 (which may be a variety of keystore devices, as previously described). Following issuance of recipient credentials, all data associated with the recipient credential is erased from administrative device 112.

To delegate conditional access to the recipient, administrative device 112 also sends the encrypted access credential to the decentralized network 164 in step 234. To verify that the delegated access privileges are warranted, the decentralized network requests recipient information in step 244 from servers 146. In step 254, the servers 146 send the requested recipient information to the trained classifier 145, which classifies the recipient information as warranting of the change in privileges in step 264. This result is then communicated to the block chain interface logic 144 in step 274. Block chain interface logic 144 creates a network node within decentralized network 164 indicating that the change in access privileges is warranted in step 284.

The recipient uses recipient device 116 to request the encrypted recipient credential from the key-value store on decentralized network 164 in step 294, which is transmitted within step 215. Following decrypting the recipient credential in step 225, the recipient requests authentication using authentication logic 165 in step 235.

To determine if authentication of the user is appropriate, verification logic communicates with decentralized network 164 to verify that the access privileges are warranted in step 245. In step 255, this verification is communicated to modification logic 142, instigating the modification logic to modify the recipient credential property, updating the recipient credential to indicate verified new access privileges within decentralized network 164 in step 265. This modification is communicated, within step 275, to output logic 143, which will then communicate the change in access to other decentralized network nodes within decentralized network 164 in step 285. This process allows for the decentralized network 164 to authenticate the recipient within step 295, and finally, in step 296, the recipient accesses the appropriate resource within step 296. A user skilled in the art will recognize that a variety of permutations of the communication described are possible to regularly verify and confirm user access without diverting from the scope or spirit of the disclosed system. Flow 200C is given as an example communication and should not be considered a limitation.

A second example is now described, wherein inappropriate authentication is prevented by the disclosed system.

Figure 2D:
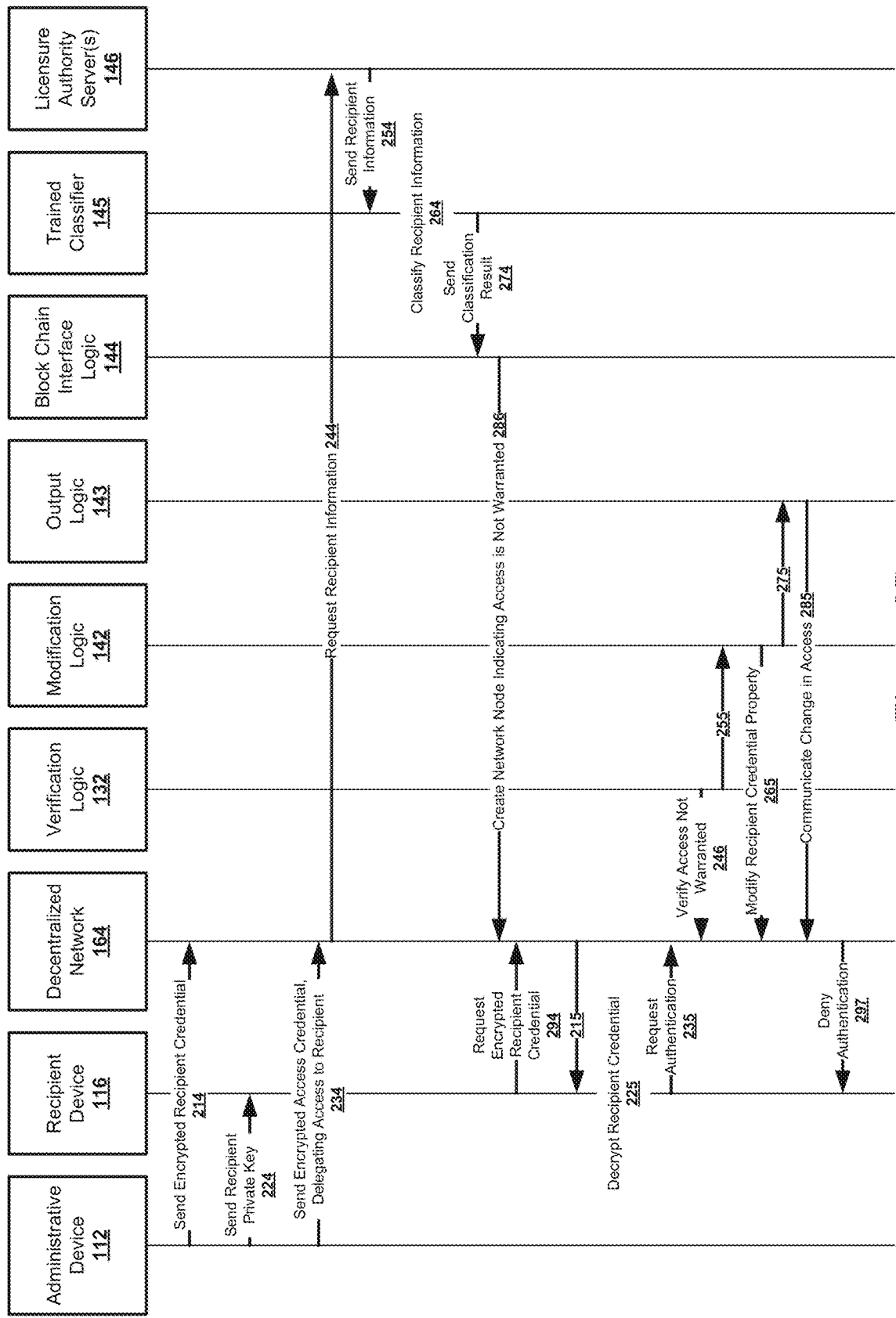
FIG. 2D shows a message flow diagram for user credential management leveraging a private key stored on a provisioned device, comprising unsuccessful authentication of a user.

FIG. 2D shows a message flow diagram 200D for user credential management leveraging a private key stored on a provisioned device, comprising unsuccessful authentication of a user. Flow 200D comprises the same components as flow 200C, and the process is identical up until step 286. In contrast to flow 200C, the trained classifier determines within flow 200D that the change in privileges for the recipient is not warranted, per information received from one or more licensure authorities. Thus, in step 286, the blockchain interface logic 144 communicates to decentralized network 164 that the change in access is not warranted, creating a new network node. As a result, when recipient device 116 requests authentication following decrypting the recipient access credential (steps 294, 215, 225, and 235, as described within flow 200C), the verification logic generates an output stating that the access privilege is not valid in step 246. Following communication of this information to modification logic 142 in step 255, modification logic 142 modifies the recipient credential as necessary in step 265. This is communicated to output logic 143 (step 275), and the result is communicated to decentralized network 164 in step 285. Thus, decentralized network 164 will deny authentication to the recipient in step 297.

In addition to changes in licensure status, as communicated by one or more licensure authority servers 146, changes in user access privilege status can also be managed internally by an administrator 102 for any reason at any time. This management can include revocation of a user credential, or an access credential, from a particular user.

Figure 3A:
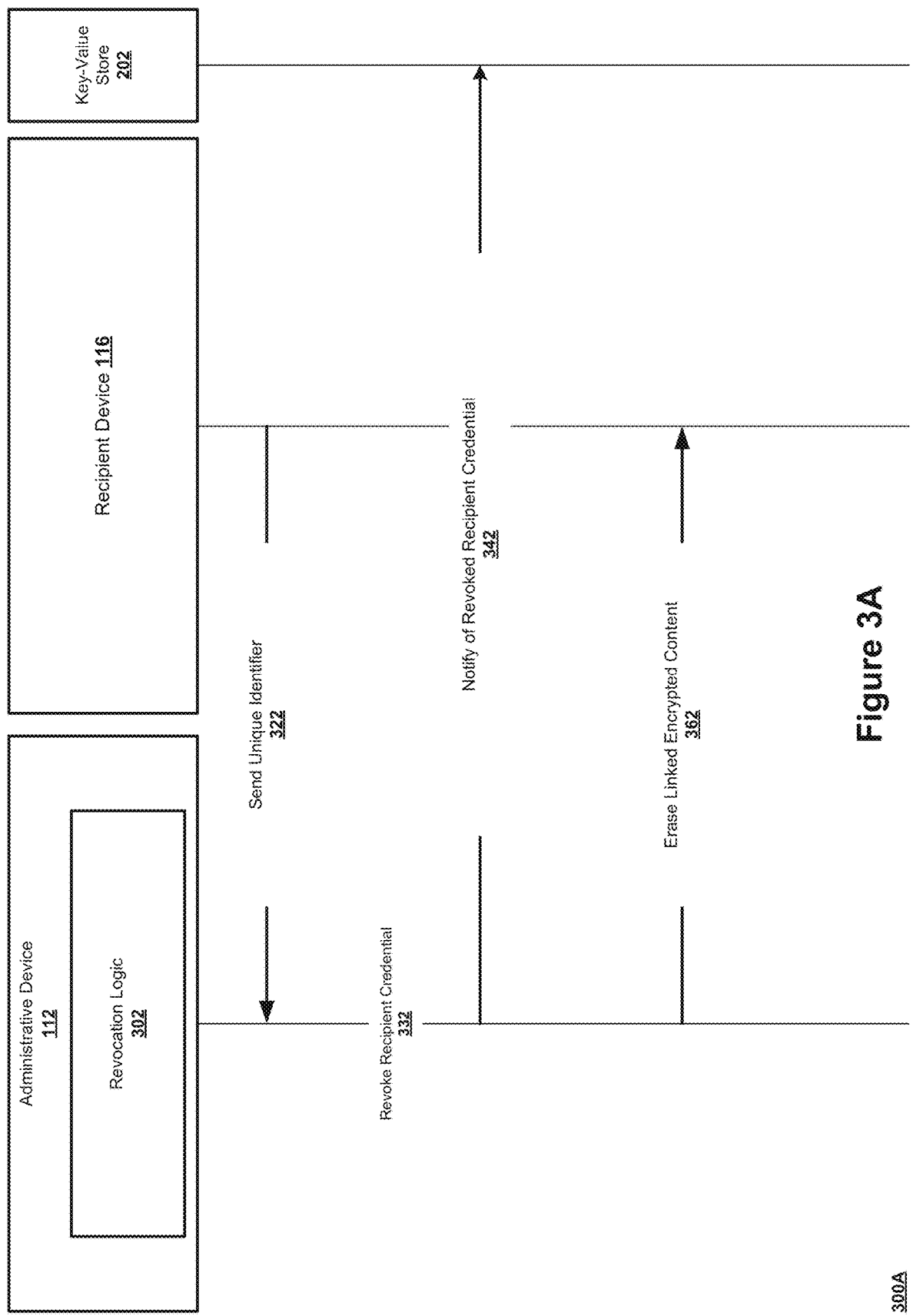
FIG. 3A shows a message flow diagram for user credential revocation leveraging private keys stored on provisioned devices.

FIG. 3A shows a message flow diagram 300A for user credential revocation leveraging private keys stored on provisioned devices. When an administrator 102 intends to revoke a credential from a particular recipient, the administrator 102 invokes revocation through revocation logic 302 running on administrative device 112. The administrative device 112 can request a unique identifier from the recipient device 116 in step 322, such as the recipient private key or the device private key. If the recipient device 116 is not present, the administrative device 112 may also communicate with key-value store 202 to receive a recipient public key or recipient identifier such as an email address, phone number, or license number. In step 332, the administrative device revokes the recipient credential using the administrative private key or a smart contract private key respective to a particular privilege. In other implementations, access for a particular recipient may also be automatically revoked upon meeting a certain expiration term such as a time limit, resource usage limit, or location restriction. Following revocation, the change in status is communicated to key-value store 202 in step 342. As a result, the administrative device may erase any linked encrypted content from the recipient device 116 in step 362. The following flow depicted in FIG. 3B illustrates how management logics within the disclosed system may interact with the revocation process, per certain implementations.

Figure 3B:
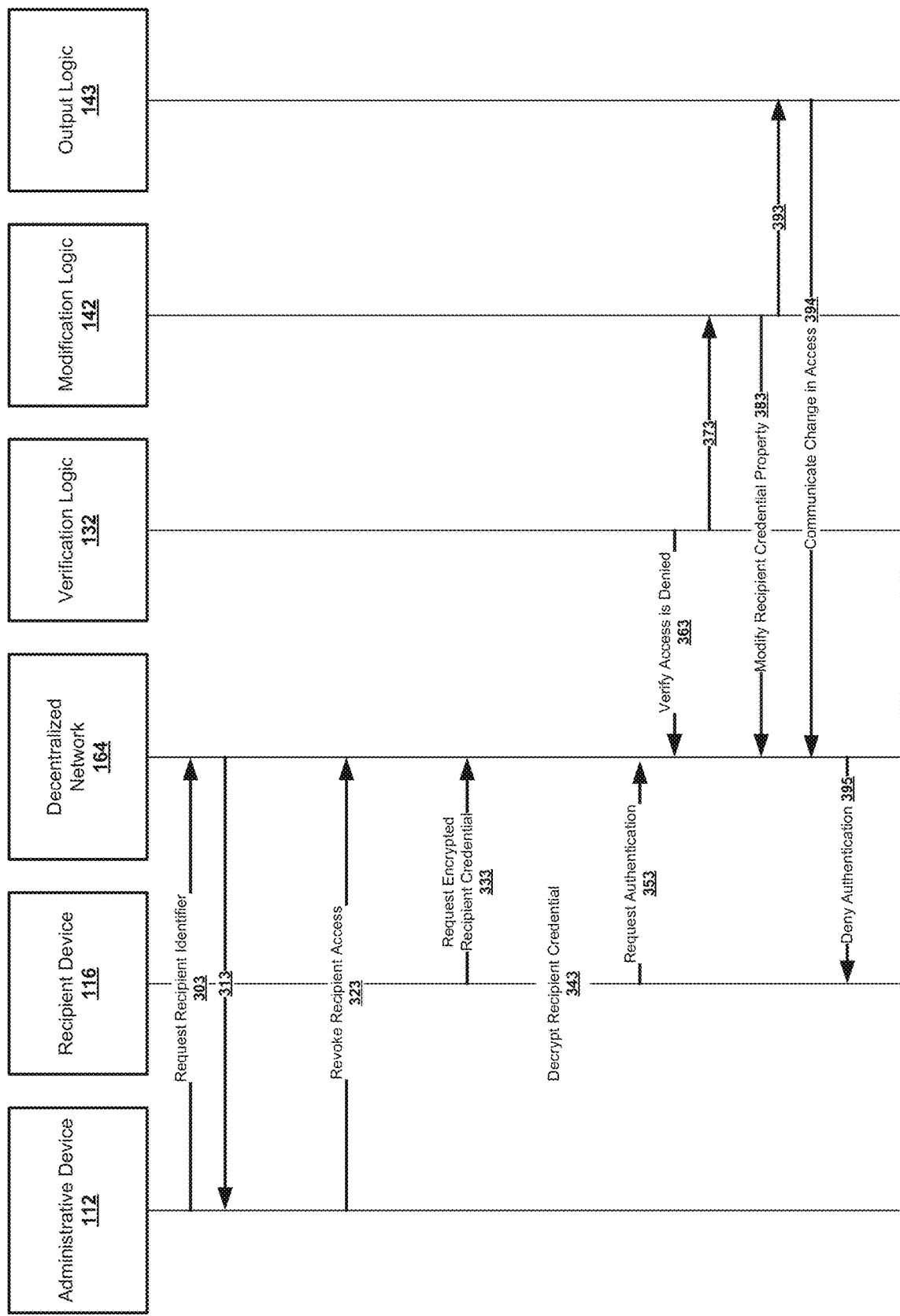
FIG. 3B shows a message flow diagram for user credential management leveraging a private key stored on a provisioned device, comprising revocation of a user credential.

FIG. 3B shows a message flow diagram 300B for user credential management leveraging a private key stored on a provisioned device, comprising revocation of a user credential. Flow 300B comprises the same components as flow 300A, and the process can be considered identical up until step 333. Steps 303, 313, and 323 summarize the process depicted within flow 300A, although certain aspects are omitted from the diagram for clarity.

In an implementation wherein the recipient still possesses an active user credential to which certain specific access privileges have been revoked, or an implementation in which the recipient device 116 still possesses active device credentials but is not associated with a particular user credential, recipient device may request a particular encrypted credential from the decentralized network 164 in step 333. Upon decryption of the recipient credential in step 343, the recipient device 116 may request authentication for a particular resource in step 353. Alternatively, the recipient device may be unable to receive a recipient credential in the event that the entire user credential has been erased within a revocation transaction.

In the event that recipient device 116 is requesting authentication 353 for an invalid access request, verification logic 132 will verify to decentralized network 164 that access to the requested resource is not valid in step 363. This verification may be communicated to modification logic 142 in step 373, which will instigate modification of the recipient credential by modification logic 142 in step 383. The modification is communicated to output logic 142 in step 393, followed by output logic 142 communicating the change in access to a set of decentralized networked nodes within decentralized network 164 in step 394. As a result, decentralized network 164 denies authentication to the recipient in step 395. In certain implementations, verification logic 132, modification logic 142, and output logic 143 may perform similarly in return to communication from a revocation transaction on administrative device 112 without recipient device 116 requesting authentication. As previously stated, a user skilled in the art will recognize that a variety of permutations of the communication described are possible to regularly verify and confirm user access revocation without diverting from the scope or spirit of the disclosed system. Flows 200D, 300A, and 300B are given as explicitly for example communication and should not be considered limitations of the disclosed system.

Ecosystem

Figure 4:
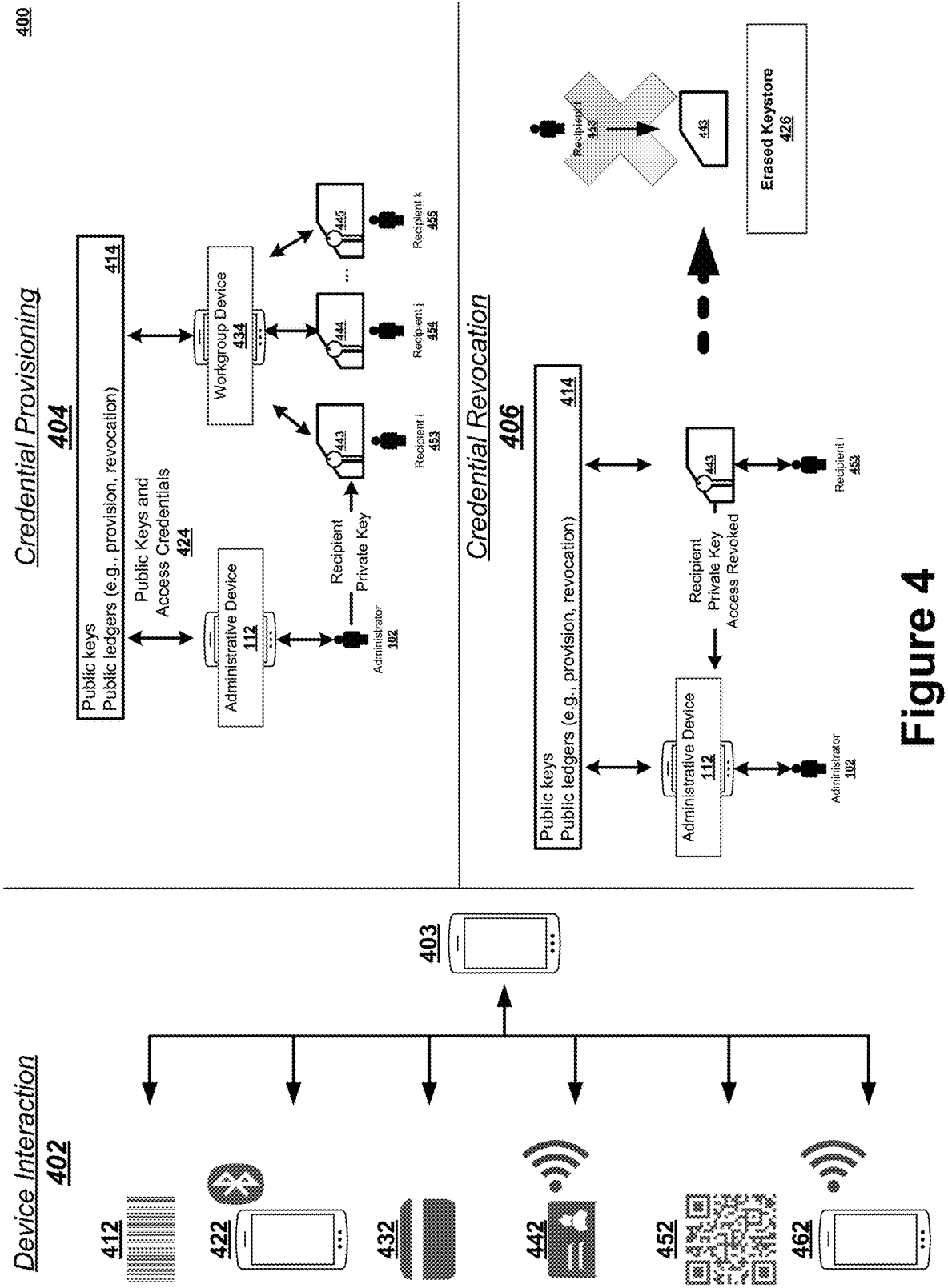
FIG. 4 shows a schematic diagram for example devices and interactions in agreement with one implementation of the disclosed technology.

An ecosystem for implementation of the disclosed system described above will now be described. FIG. 4 shows a schematic diagram 400 for example devices and interactions in agreement with one implementation of the disclosed technology.

Section 402 illustrates example devices that can be used to implement the disclosed system in certain embodiments of the technology disclosed. The system disclosed allows administrators within an enterprise to quickly and efficiently issue user credentials (as well as delegate access credentials to a user) through close-range communication methods, effectively bypassing any server-side channels; hence, preventing any user private keys from ever being transmitted over cloud-based server 402 or decentralized network 164.

In many implementations, the disclosed system comprises an administrator 102 using administrative device 112 to provision a recipient credential to recipient 106 via recipient device 116 or a workgroup device 434, wherein both devices are credentialed to access a cloud-based server 414. The process occurs over close-range communication channels, using hardware technology such as the examples shown in illustrations 412, 422, 432, 442, 452, and 462. Within the user credential issuance process, both administrator 102 and recipient 106 may use a mobile device such as smartphone 403. However, either or both devices may be exchanged for an alternative mobile hardware device without deviating from the scope or spirit of the disclosed system.

Smartphone 403 may communicate to another device using Bluetooth such as smartphone 422, or a form of close-range technology such as RFID, NFC, link-local IP addresses on Wi-Fi chips, or integrated circuit technology within smartphone 462. In addition to smartphones, a variety of other forms of hardware exist such as an optical tags and patterns capable of being read by sensors (e.g., one-dimensional bar code 412 or Quick-Response (QR) code 452 within a badge or tag), badge 442 equipped with RFID, NFC, or USB dongle components, or a physical card 432 with magnetic stripes, integrated circuits, and EMV chips. The keystore may be a pre-existing provisioned device prepared to receive user issuance, or a newly-generated device provisioned in response to a specific need as it arises, such as a printed badge following a request for access delegation. A user skilled in the art will recognize that these methods for information exchange between devices are listed explicitly as examples not to be considered as a limitation of the disclosed technology, and a variety of other close-range communication technologies exist within the scope of the disclosed technology.

The devices described within section 402 can be used to implement the described scenarios within schematics 404 and 406.

Schematic 404 comprises a scenario describing the provisioning of credentials leveraging close-range communication on provisioned devices, wherein user private keys are stored on a respective keystore read by a multi-tenant provisioned device. The embodiment depicted in schematic 404 comprises a cloud-based server 414 (which may be a decentralized network 164 or other decentralized database or server), administrative device 112 accessed by administrator 102, and a workgroup device 434 accessed by recipient i 453, recipient j 454, and recipient k 455. Although there are three recipients listed in this example, any number of recipients can authenticate using the same workgroup device 434.

Administrative device 112 has already been provisioned with a set of administrative device which have been delegated access to privileges necessary to issue other user and device credentials, as well as privileges necessary to access a key-value store and transactional ledgers on cloud-based server 414. Workgroup device 434 has also previously been provisioned with a set of workgroup device which have been delegated access to privileges necessary to access a key-value store on cloud-based server 414.

When administrator 102 intends to provision user credentials to recipient i 453, recipient j 454, or recipient k 455, administrator 102 accesses the credential administration logic on administrative device 112 using protocols as described above. Administrative device 112 transmits any public keys and recipient credentials 424 to the key-value store on cloud-based server 414, and a provisioning transaction is also recorded on cloud-based server 414. Administrative device 112 stores the respective recipient private key for each user on the appropriate keystore, such as recipient i 453's keystore 443, recipient j 484's keystore 444, or recipient k 455's keystore 445.

Following issuance of credentials via a credential issuance logic, administrative device 112 employs a privacy protection logic to erase all sensitive information related to issuance transactions from administrative device 112. At this stage, recipient private keys are exclusively stored and locally sequestered on recipient keystores 443, 444, and 445. Each recipient, such as recipient i 453 along with keystore 443, is now able to use their respective keystore to authenticate into workgroup device 434 as previously described above. Once authenticated, the user will be able to access any privileges delegated to their credential by administrator 102, such as access to a decentralized networked node 124 within decentralized network 164.

In contrast, schematic 406 comprises a scenario describing the revocation of credentials leveraging close-range communication on provisioned devices. Schematic 406 follows similar processes as described previously above. The embodiment depicted in schematic 406 comprises a cloud-based server 414 (which may be a decentralized network 164 or other decentralized database or server), administrative device 112 accessed by administrator 102, and a keystore 443 accessed by recipient i 453.

Administrative device 112 has already been provisioned with a set of administrative device which have been delegated access to privileges necessary to issue other user and device credentials, as well as privileges necessary to access a key-value store and transactional ledgers on cloud-based server 414. Administrative device 112 employs a revocation logic to revoke all user credentials for recipient i 453, such that the revocation is communicated to cloud-based server 414 and the recipient private key is revoked from keystore 443. Following the revocation process, keystore 443 becomes an erased keystore 426, no longer accessible for authentication use by recipient i 453.

Privacy Protection Measures

The disclosed system implements a variety of privacy protection measures that will now be summarized to emphasize the tactics by which security risks are minimized. Private keys for all users are always stored locally on mobile devices, and private keys of separate users are sequestered on separate respective devices (i.e., individual recipients either use their own respective recipient device, or in the event that multiple recipients use a shared workgroup device, recipient private keys are stored in a separate keystore and the recipient private key is always erased from the workgroup device following authentication). Because each transaction and interaction with decentralized network 164 is directly tied to a particular user credential, and there is a detailed ledger of any access delegation transactions related to a particular action, each action may be clearly traced back to the specific responsible user.

The plurality of smart contract conditions implemented to limit conditional access delegation to recipients are structured such that access is frequently delegated through an evanescent credential and in the event that an access credential is invalidated or expires, any evidence supporting the recipient at expiry is automatically deleted. In addition to a number of conditional access limitations enacted by smart contracts, access is always revocable in a straightforward process where the administrator uses their own credentials or smart contract credentials to revoke the access credential. A transaction ledger comprises a record of all issuance, provisioning, delegation, and revocation transactions for the maintenance of integrity.

In many implementations of the technology disclosed, system 100 has access to one or more external servers corresponding to trusted sources (e.g., government organizations or credentialing agencies) for verification of a recipient's qualifications or clearance level prior to delegating access to a private permissioned function within the enterprise operations. In certain implementations of the technology disclosed, verification and modification logics are configured to verify that a change in user status or privileges is appropriate and enact the proper modification to distributed network 164. Some implementations further include a machine learning classifier trained to detect if a change in user status or privileges is warranted or if a change in user status or privileges is suspected for malicious or inappropriate access. Implementation of machine learning classifiers is further elaborated upon later in the Application.

Enterprises may implement many levels of multi-factor authentication for their users prior to accessing sensitive information or resources. To access a particular application, data source, function, or resource, a user may require the use of two separate items: a mobile device and an additional keystore storing the user's private key. Moreover, one or both of these hardware devices may be configured to exclusively function at a particular location or while connected to a particular network. If a hardware device does not meet these requirements (or any qualifying event occurs resulting in an administrator desiring to restrict access to the device of concern), the device may refuse all authentication attempts or become "bricked" so that it is no longer functional.

A user may also require input of a passcode or biometric prior to authentication into an application. A user device may require close-range communication with a location-specific or administrator-managed hardware device prior to authentication. Any or all of the described authentication methods may be required in a multi-factor authentication process. For example, a user may use facial recognition to unlock a provisioned device, triggering the provisioned device to request communication with a keystore that contains the user private key. For further security, a user may also have to input a passcode to initiate recipient public key generation once the device has obtained a user private key. A user skilled in the art will be familiar with the variety of multi-factor authentication permutations that may be applied to the disclosed system. Devices may also be configured to automatically log a user out or erase any sensitive user information and therefore require re-authentication after a certain pre-determined period of time where the device is idle. If a user fails to successfully complete authentication a pre-determined number of attempts, the user credentials, device credentials, or both sets of credentials may be locked out pending review by an administrator.

For additional regulation of IAM systems, enterprises may also provision user credentials to one or more "super-administrators" responsible for the management of administrative credentials for one or more administrators. As a result of the decentralized structure of the disclosed system, it is simple to lock out a specific user, revoke the user's access credentials, or revoke the user credential entirely without affecting the access of unrelated devices and users. By means of locally-sequestered, self-sovereign user credentials, a breach of the key-value store would not allow a bad actor to impersonate any existing user within the database or directory. In the event that a bad actor obtains the necessary technology to impersonate a particular user and successfully authenticate into the user's access privileges for a period of time before an administrator is able to perform necessary revocations to control the risk, the bad actor will be limited to the particular user's access privileges and associated conditions imposed upon the delegated access (i.e., access to one user's information does not provide a route to access of another user's information, regardless of the breached user account's administrative status or clearance level).

As a result of the described precautions, the disclosed system is resistant to explosion of access rights, under-the-radar outdated access privileges, uncontrolled data leak events, and other sources of inappropriate authentication.

Machine Learning Classifier

In response to one or more licensure authority servers 165 communicating information to system 100 related to the approval, issuance, revocation, or a suspension of a license, a trained classifier 155 classifies the information as to whether or not a change in privilege or status of a credentialled individual is indicated.

In some implementations of the technology disclosed, the disclosed classifier is a classification model (e.g., discriminant analyses, regression, decision trees, and so on). In other implementations of the technology disclosed, the disclosed classifier is a form of cluster analysis (e.g., hierarchical clustering, K-means, density-based spatial clustering of applications with noise (DBSCAN), and so on). In yet other technology implementations disclosed, other pattern recognition analyses may be implemented, such as ensemble learning (e.g., boosting, bagging, and so on), Bayesian networks, or Markov random fields. In any of the implementations mentioned above, feedforward neural networks, deep neural networks, convolutional neural networks, transformers, or autoencoders may also be applied as decision-making tools.

As a representative example, the discussion now turns to a description of a neural network as the trained classifier 155, in one implementation of the technology disclosed.

Figure 5:
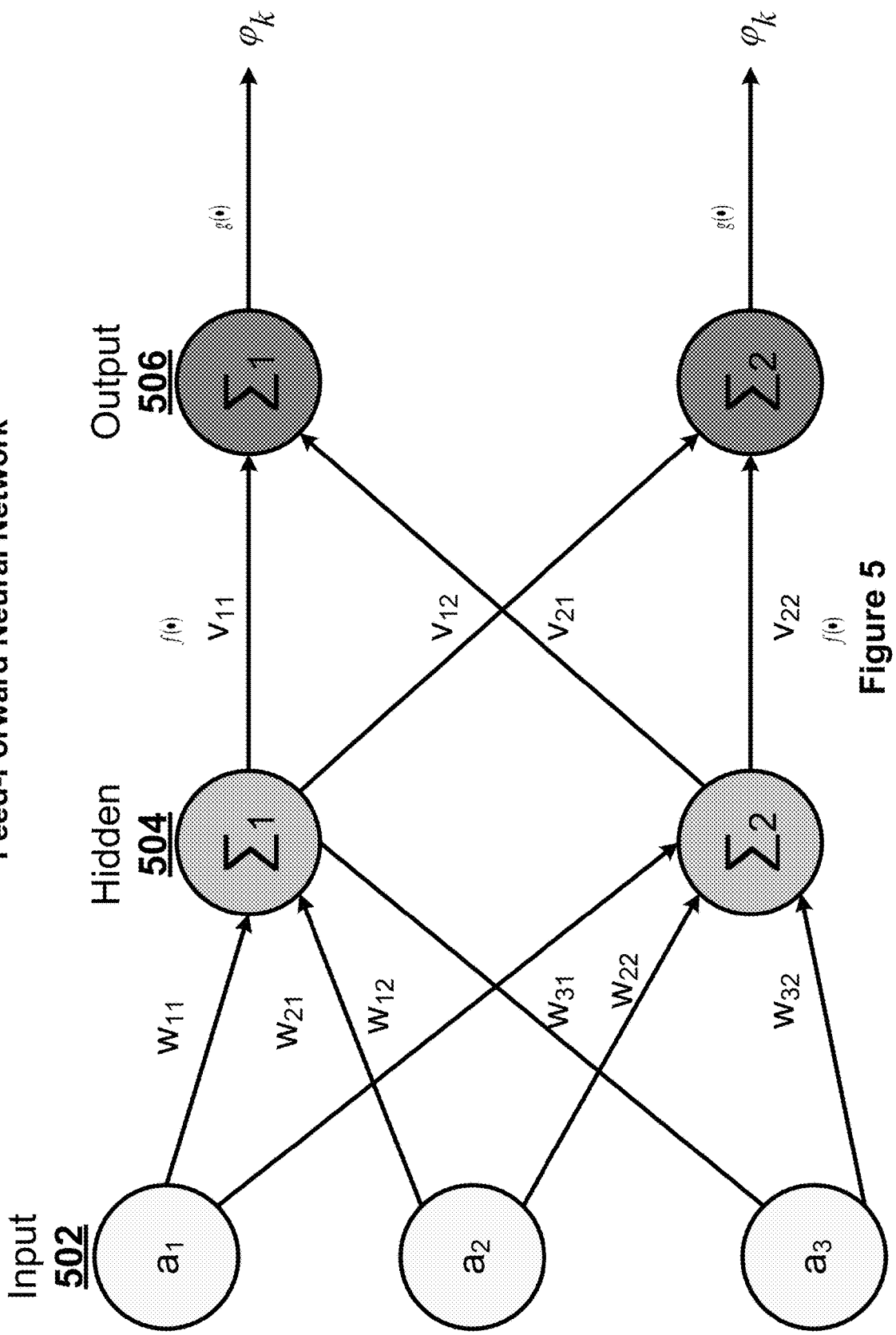
FIG. 5 illustrates a representative neural network suitable for implementing the disclosed technology.

FIG. 5 illustrates a representative neural network suitable for implementing the disclosed technology. Neural network 500 is a fully connected neural network with multiple layers. A neural network is a system of interconnected artificial neurons (e.g., a1, a2, a3) that exchange messages between each other. Neural network 500 has three inputs 502, two neurons in the hidden layer and two neurons in the output layer. The hidden layer 504 has an activation function f(•) and the output layer 506 has an activation function g(•). The connections have numeric weights (e.g., w11, w21, w12, w31, w22, w32, v11, v12, v21, v22) that are tuned during the training process, so that a properly trained network responds correctly when fed an image to recognize. The input layer 502 processes the raw input, the hidden layer 504 processes the output from the input layer based on the weights of the connections between the input layer and the hidden layer. The output layer 506 takes the output from the hidden layer and processes it based on the weights of the connections between the hidden layer and the output layer. The network includes multiple layers of feature-detecting neurons. Each layer has many neurons that respond to different combinations of inputs from the previous layers. These layers are constructed so that the first layer detects a set of primitive patterns in the input image data, the second layer detects patterns of patterns and the third layer detects patterns of those patterns.

Neural network 500 is trained through a back propagation algorithm, as described below.

Figure 6:
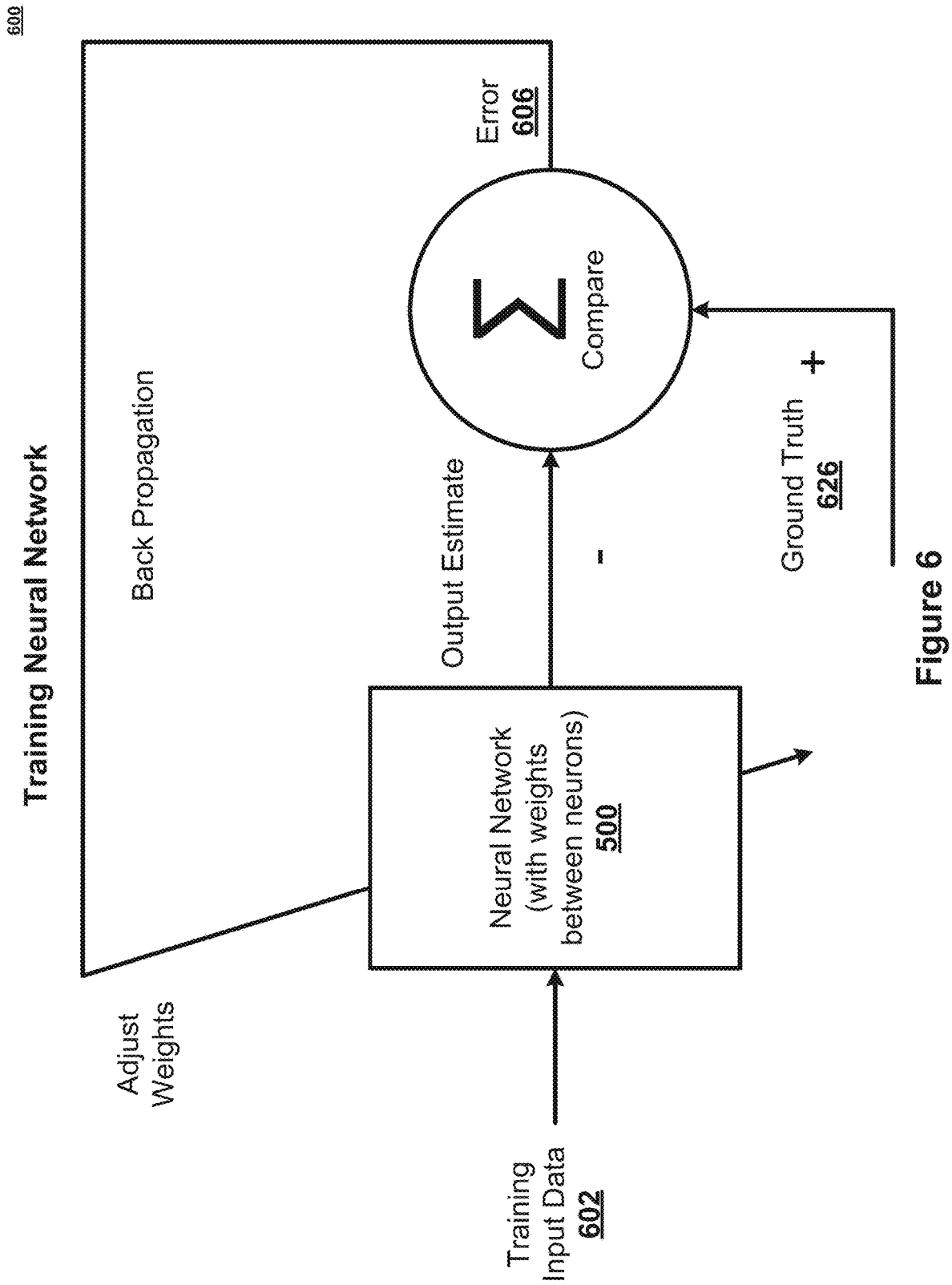
FIG. 6 depicts a block diagram of training neural network in accordance with one implementation of the technology disclosed.

FIG. 6 depicts a block diagram of training neural network 500 in accordance with one implementation of the technology disclosed. Neural network 500 is adjusted or trained so that the input data leads to a specific output estimate. Neural network 500 is adjusted using back propagation based on a comparison of the output estimate and the ground truth until the output estimate progressively matches or approaches the ground truth.

Neural network 500 is trained by adjusting the weights between the neurons based on the difference between the ground truth and the actual output. This is mathematically described as:

$$\Delta w_i = x_i \delta$$

where δ=(ground truth)−(actual output)

In one implementation, the training rule is defined as:

$$w_{nm} \leftarrow w_{nm} + \alpha(t_m - \varphi_m)a_n$$

In the equation above: the arrow indicates an update of the value; $t_m$ is the target value of neuron m; $\varphi_m$ is the computed current output of neuron m; $a_n$ is input n; and α is the learning rate.

The intermediary step in the training includes generating a feature vector from the input data using the convolution layers. The gradient with respect to the weights in each layer, starting at the output, is calculated. This is referred to as the backward pass, or going backwards. The weights in the network are updated using a combination of the negative gradient and previous weights.

In one implementation, neural network 500 is trained by a stochastic gradient update algorithm (such as ADAM) that performs backward propagation of errors by means of gradient descent. One example of a sigmoid function based back propagation algorithm is described below:

$$\varphi = f(h) = \frac{1}{1 + e^{-h}}$$

In the sigmoid function above, h is the weighted sum computed by a neuron.

The sigmoid function has the following derivative:

$$\frac{\partial \varphi}{\partial h} = \varphi(1 - \varphi)$$

The algorithm includes computing the activation of all neurons in the network, yielding an output for the forward pass. The activation of neuron m in the hidden layers is described as:

$$\varphi_m = \frac{1}{1+e^{-hm}}$$

$$h_m = \sum_{n=1}^{N} a_n w_{nm}$$

This is done for all the hidden layers to get the activation described as:

$$\varphi_k = \frac{1}{1+e^{hk}}$$

$$h_k = \sum_{m=1}^{M} \varphi_m v_{mk}$$

Then, the error and the correct weights are calculated per layer. The error at the output is computed as:

$$\delta_{ok} = (t_k - \varphi_k)\varphi_k(1-\varphi_k)$$

The error in the hidden layers is calculated as:

$$\delta_{hm} = \varphi_m(1-\varphi_m)\sum_{k=1}^{K} v_{mk}\delta_{ok}$$

The weights of the output layer are updated as:

$$v_{mk} \leftarrow v_{mk} + \alpha\delta_{ok}\varphi_m$$

The weights of the hidden layers are updated using the learning rate $\alpha$ as:

$$v_{nm} \leftarrow w_{nm} + \alpha\delta_{hm}a_n$$

In one implementation, neural network 500 is trained by a gradient descent optimization to compute the error across all the layers. In such an optimization, for an input feature vector x and the predicted output ŷ, the loss function is defined as Z for the cost of predicting ŷ when the target is y, i.e. l(ŷ, y). The predicted output ŷ is transformed from the input feature vector x using function $f$. Function $f$ is parameterized by the weights of neural network, i.e. ŷ=$f_w$(x). The loss function is described as l(ŷ, y)=l($f_w$(x), y), or Q(z, w)=l($f_w$(x), y) where z is an input and output data pair (x, y). The gradient descent optimization is performed by updating the weights according to:

$$v_{t+1} = \mu v_t - \alpha \frac{1}{n}\sum_{i=1}^{N} \nabla w_t Q(z_t, w_t)$$

$$w_{t+1} = w_t + v_{t+1}$$

In the equations above, $\alpha$ is the learning rate. Also, the loss is computed as the average over a set of n data pairs. The computation is terminated when the learning rate $\alpha$ is small enough upon linear convergence. In other implementations, the gradient is calculated using only selected data pairs fed to a Nesterov's accelerated gradient and an adaptive gradient to inject computation efficiency.

In one implementation, neural network 500 is trained by a stochastic gradient descent (SGD) to calculate the cost function. A SGD approximates the gradient with respect to the weights in the loss function by computing it from only one, randomized, data pair, $z_t$, described as:

$$v_{t+1} = \mu v - \alpha \nabla w Q(z_t, w_t)$$

$$W_{t+1} = W_t + V_{t+1}$$

In the equations above: $\alpha$ is the learning rate; $\mu$ is the momentum; and t is the current weight state before updating. The convergence speed of SGD is approximately O(1/t) when the learning rate $\alpha$ are reduced both fast and slow enough. In other implementations, neural network 500 uses different loss functions such as Euclidean loss and softmax loss. In a further implementation, an Adam stochastic optimizer is used to train neural network 500.

In one exemplary implementation, some neural networks implementing learning model(s) 155 are implemented as an ensemble of subnetworks trained using datasets widely chosen from approved transactions and flagged transactions, with outputs including classifications of anomalies based upon the input sensed data, and/or remedial actions to be triggered by invoking downstream applications such as preparing and submitting reports to blockchain implemented regulatory compliance information, as well as the capability to both cluster information and to escalate problems. Having described neural network implementations, the discussion now turns to deep learning approaches.

Figure 7:
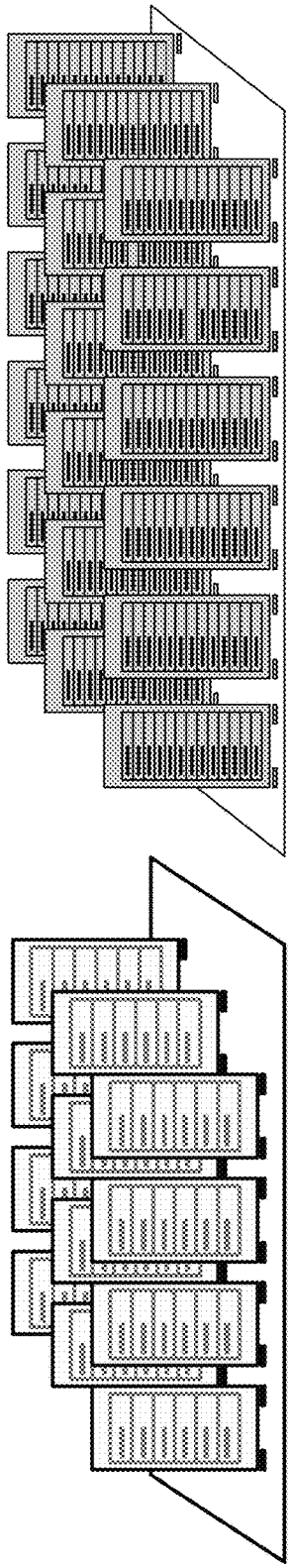
FIG. 7 illustrates a deep learning system in a supervised or semi-supervised implementation.
Figure 7:
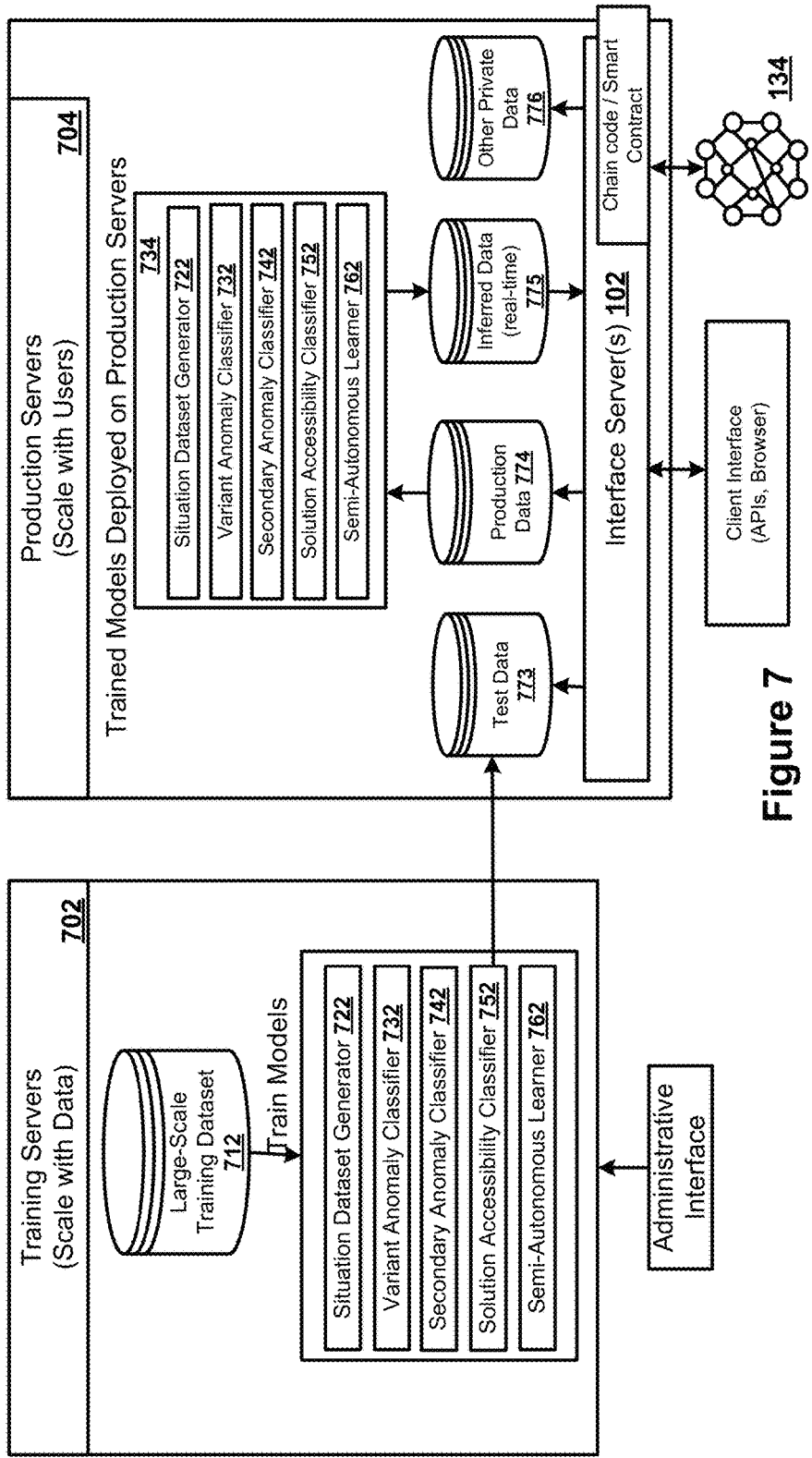

FIG. 7 illustrates a deep learning system in a supervised or semi-supervised implementation. As shown, deep learning system 700 includes training servers 702 and production servers 704. Large scale training dataset 712 is accessible to training servers 702 for training the deep convolutional neural network 734. In an implementation, deep neural network 734 includes a first anomaly subnetwork, and a second solution accessibility subnetwork that are trained on one or more training servers 702. The trained deep neural network ensemble including the first trained anomaly subnetwork, and the trained second solution accessibility subnetwork are deployed on one or more production servers 704 that receive input anomaly information from requesting client devices. The production servers 704 process the input anomaly information through at least one of the deep neural network 734, the first anomaly subnetwork, and the second solution accessibility subnetwork to produce outputs that are transmitted to the client devices 122.

Training servers 702 conduct training using models and comprise a situation dataset generator 722 includes a deep convolutional neural network based variant anomaly classifier, running on numerous processors coupled to memory that prepares training sets comprising data chosen from large scale training dataset 712 to reflect one or more scenarios being trained, a variant anomaly classifier 732 includes a deep convolutional neural network based variant anomaly classifier, running on numerous processors coupled to memory that is trained to recognize anomalous situations from sensed data using the scenarios prepared, an optional secondary classifier 742 includes a deep convolutional neural network based secondary anomaly classifier, running on numerous processors coupled to memory that is trained to recognize special situation anomalies (e.g., radioactive spill, biohazard, etc.), a solution accessibility classifier 752 includes a deep convolutional neural network based secondary anomaly classifier, running on numerous processors coupled to memory that is trained to recognize anomalies and output identifiers identifying remedial applications that are invoked to trigger remedial actions. A semi-autonomous learner 762 includes a deep convolutional neural network based variant anomaly classifier, running on numerous processors coupled to memory that progressively augments a set size of the anomaly training set based on the trained ensemble's evaluation of a synthetic set or in implementations, input of live data from a real world scenario.

In one implementation, the neural networks such as situation dataset generator, variant anomaly classifier, secondary anomaly classifier, solution accessibility classifier, and semi-autonomous learner are communicably linked to the storage subsystem comprised of test data database 773, production data database 774, inferred data database 775 and other private data database 776 and user interface input devices.

In one implementation, data used in one or more of large scale training dataset 712, test data database 773, production data database 774, inferred data database 775 and other private data database 776 is selectively obtained from multiple sources of data: (i) various drug databases (e.g., the FDA Product-Specific Guidance database, which enables searching and clustering by active ingredient(s)) and communications including machine reading of emails on recalls minimizes the need to change notification protocols that can be related to machine-readable data and image recognition (e.g. images of pills) and (ii) user responses to deep learning driven follow-up questions selected by the solution accessibility classifier 752 and semi-autonomous learner 762 (allowing for live training and refinement).

Blockchain-Based Chain Code/Smart Contracts

Figure 8:
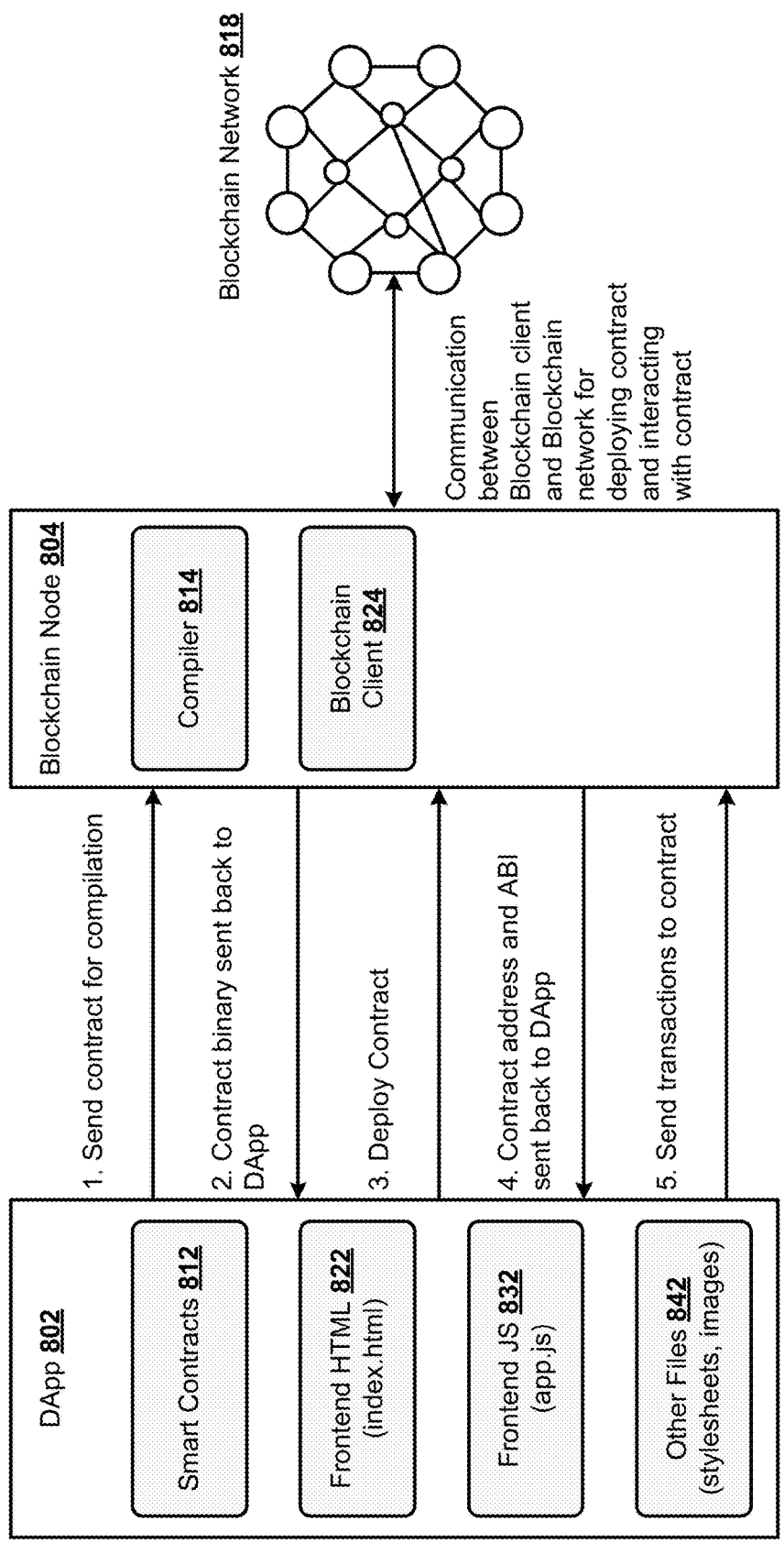
FIG. 8 is a flow diagram depicting an example publicly accessible blockchain transactions that can be used to implement the technology disclosed.

FIG. 8 is a flow diagram 800 depicting an example publicly accessible blockchain transactions that can be used to implement the technology disclosed. DApp 802 is used to store the anomaly reports in the tamper-proof blockchain network 164. DApp 802 is decentralized in nature, with no single entity or organization controlling the infrastructure on which the applications are deployed. In the context of Ethereum™, DApp 802 is backed by smart contracts 812 which are deployed on the Ethereum™ blockchain platform that is maintained by the Ethereum™ nodes or peers worldwide. Even though DApp 802 is deployed on a central server which is either a full Ethereum™ node or a can communicate with an Ethereum™ node, the server only serves the DApp's web interface. The DApp logic is controlled by the associated smart contracts 812 which are deployed on the blockchain network 164. DApp 802 provides a friendly interface to smart contracts 812 where the client devices 122 can submit transactions to the contracts from a web interface based on frontend HTML 822, frontend JavaScript (JS) 832, and other files 842 like stylesheets and images. A DApp's web interface forwards the transactions to the blockchain platform and displays the transaction receipts or state information in the smart contracts 812 in the web interface. DApp 802 can use a decentralized messaging protocol such as Whisper™ for communication and decentralized storage platforms such as Swarm™ for static storage.

In example 800, DApp 802 sends a smart contract to the blockchain node 804 for compilation. Blockchain node 804 comprises a compiler 814 and a blockchain client 824. Compiler 814 can compile smart contracts written in various high-level languages such as Solidity™, Serpent™, and Lisp™. Blockchain client 824 communicates with the blockchain network 164 and performs tasks such as creating accounts and contracts, sending transactions to contracts, and others. Examples of blockchain client devices 824 include geth (written in Go™) and pyethapp (written in Python™).

In response, the blockchain node 804 sends the contract binary to DApp 802. This allows DApp 802 to deploy the contract on the blockchain node 804. Once the contract is deployed, the blockchain node 804 sends a contract address and an application binary interface (ABI) to DApp 802. ABI provides an interface to the state variables and functions defined in the deployed contract. After this, DApp 802 sends transactions to the deployed contract.

Computer System

Figure 9:
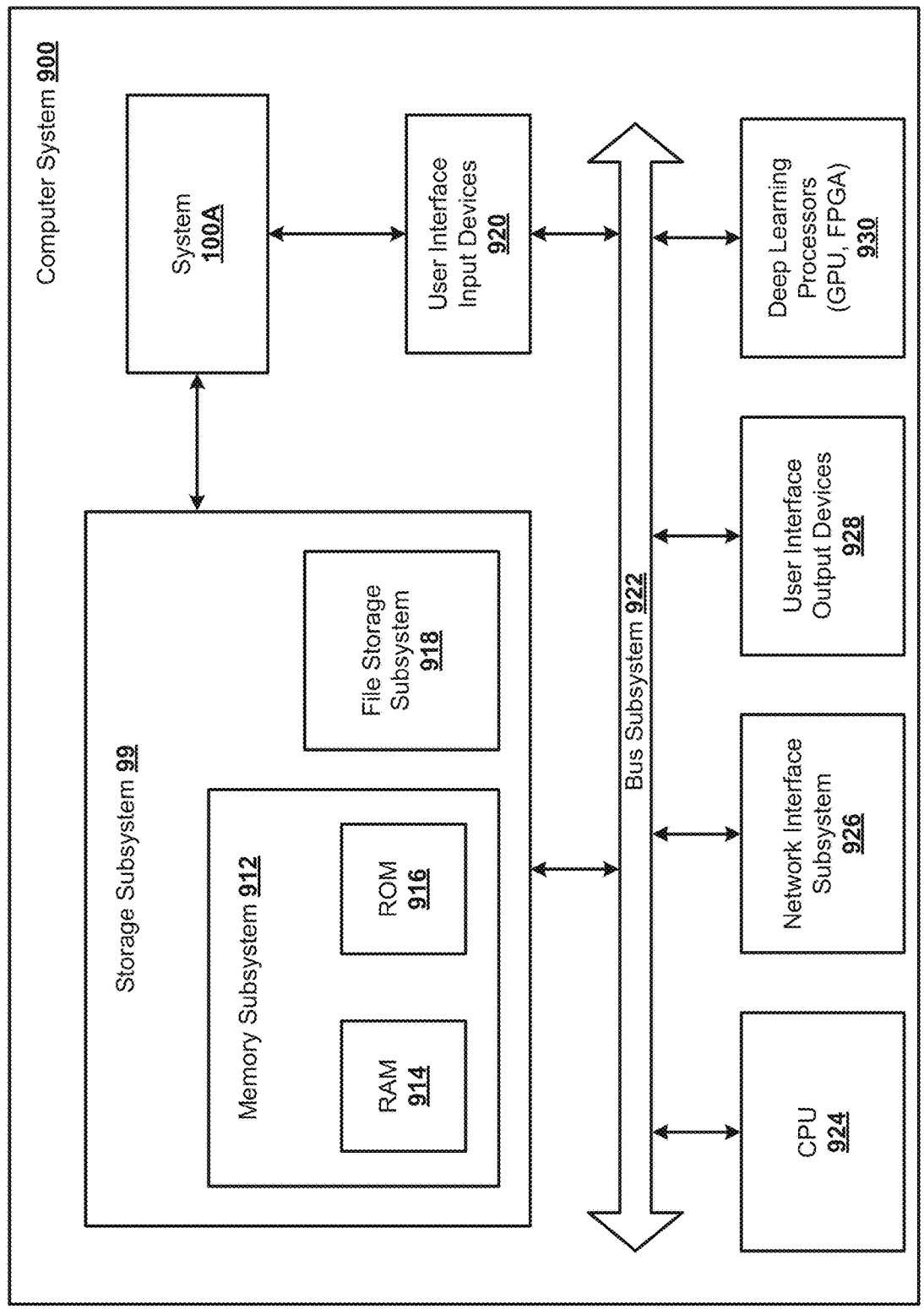
FIG. 9 shows an example computer system that can be used to implement the technology disclosed.

FIG. 9 is a simplified block diagram of a computer system 900 that can be used for system for managing user access to services using a set of decentralized networked nodes that share a private permissioned blockchain data structure or a decentralized personal ledger, to which access has been limited to users authorized by one of the set of decentralized networked nodes. Computer system 900 includes at least one central processing unit (CPU) 924 that communicates with a number of peripheral devices via bus subsystem 922, and User Credential Management System 100A, as described herein. These peripheral devices can include a storage subsystem 910 including, for example, memory devices and a file storage subsystem 918, user interface input devices 920 user interface output devices 928, and a network interface subsystem 926. The input and output devices allow user interaction with computer system 900. Network interface subsystem 926 provides an interface to outside networks, including an interface to corresponding interface devices in other computer systems. User Credential Management System 100A is communicably linked to the storage subsystem 910 and the user interface input devices 920.

User interface input devices 920 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 928 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 910 can be graphics processing units (GPUs) or field-programmable gate arrays (FPGAs).

Memory subsystem 912 used in the storage subsystem 910 can include a number of memories including a main random-access memory (RAM) 916 for storage of instructions and data during program execution and a read only memory (ROM) 916 in which fixed instructions are stored. A file storage subsystem 918 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 918 in the storage subsystem 910, or in other machines accessible by the processor.

Bus subsystem 922 provides a mechanism for letting the various components and subsystems of computer system 900 communicate with each other as intended. Although bus subsystem 922 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely distributed set of loosely networked computers, or any other data processing system or user device. Due to the ever changing nature of computers and networks, the description of computer system 900 depicted in FIG. 9 is intended only as a specific example for purposes of illustrating the preferred embodiments of the present invention. Many other configurations of computer system 900 are possible having more or fewer components than the computer system depicted in FIG. 9.

Particular Implementations

We describe some implementations and features managing user access to services using a set of decentralized networked nodes that share a private permissioned blockchain data structure or a decentralized personal ledger in the following discussion.

One implementation discloses a method for managing user access to services using a set of decentralized networked nodes that share a private permissioned blockchain data structure or a decentralized personal ledger. The system also includes an authentication logic configured to authenticate a requesting user using a decrypted user credential obtained by decrypting, using a user private key in a keystore presented by the requesting user, an encrypted user credential retrieved by querying, using a user public key, a key-value store, the user public key generated along with the user private key. The system also includes a verification logic configured to search nodes of a private permissioned blockchain data structure or a decentralized personal ledger, to obtain information indicating a change in privilege or status is warranted for the decrypted user credential. The system also includes a modification logic configured to change a property of the decrypted user credential when the information indicating a change in privilege or status is warranted is found; where a change in property limits access to services provided by the set of decentralized networked nodes that share a private permissioned blockchain data structure or a decentralized personal ledger, to which access has been limited to users authorized by one of the set of decentralized networked nodes. Other embodiments of this aspect include corresponding computer systems, apparatus, and computer programs recorded on one or more computer storage devices, each configured to perform the actions of the methods.

Many implementations of the method further include a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some implementations, the method further includes [ ].

The methods described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

One implementation of the method further includes an output logic configured to communicate to other decentralized nodes a command to at least one of pause an action, limit an amount associated with an action, and deny an action, due to the change in privilege or status.

In some implementations of the method, the method includes a connection to one or more servers to receive from a government or a private licensure authority, information including one or more of an approval, an issuance, a revocation, or a suspension, of a license; a trained classifier to classify the information as to whether a change in privilege or status of a credentialled individual is indicated; and a block chain interface logic configured to create a node on the private permissioned blockchain data structure or a decentralized personal ledger, the node including information indicating a change in privilege or status is warranted.

In certain implementations of the method, a user credential of the requesting user is provisioned by a user credential administration logic. The user credential may include the user public key, at least one of a user identifier (ID) of the requesting user, a digital signature, and metadata information about the requesting user. The user credential is encrypted using an administrative private key of the user credential administration logic and the user public key to generate the encrypted user credential. The encrypted user credential may be generated by the user credential administration logic using a decentralized identity communication (DIDComm) messaging protocol. DIDComm messaging protocol uses the administrative private key as a sender and the user public key as a recipient, and generates the encrypted user credential as a shared secret by executing an Elliptic Curve Diffie-Hellman (ECDH) key exchange.

In many implementations, the user credential administration logic may be executed on an administrative device. The user private key, user credential, encrypted user credential, and administrative private key are removed from the administrative device after the user private key is transmitted to the keystore in some implementations. In one implementation, the administrative private key is an ephemeral key.

Other implementations of the method further include the encrypted user credential being transmitted to the key-value store by the user credential administration logic. The encrypted user credential can be indexed on the key-value store by the user public key. The user private key is generated by the user credential administration logic, as well as transmitted to the keystore by the user credential administration logic, in particular implementations.

Other implementations of the method further include a key-value store including a distributed network, where distributed network includes a blockchain network or a database.

In some implementations of the technology disclosed, the authentication logic is further configured to use an elliptic curve cryptography function to generate the user public key based on the user private key. Respective user-specific authentication logics run on respective user devices in many implementations, and the respective user devices may have respective keystores. The authentication logic may be further configured to use an authentication token of a user device that has the keystore to access the key-value store. The authentication logic may also be further configured to receive the user private key from the keystore in response to a user authenticating into the user device.

In certain embodiments, the requesting user may seek authentication to a particular application running on the user device. The authentication logic can be further configured to authenticate the requesting user into a particular application using the decrypted user credential. The authentication logic can also be further configured to receive the user private key from the keystore in response to a user authenticating into the particular application. The authentication logic is further configured in some implementations to receive the user private key from the keystore in response to the keystore and a user device being tapped against each other. The authentication logic can yet also be further configured to receive, using DIDComm messaging protocol and ECDH key exchange, the encrypted user credential from the key-value store.

Implementations of the described techniques may include hardware, a method or process, or computer software on a computer-accessible medium.

Other implementations of the disclosed technology described in this section can include a tangible non-transitory computer-readable storage media, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein. The scope of the technology disclosed is defined by the appended claims.

What is claimed is:

1. A system comprising one or more processors coupled to a physical memory storing instructions for managing user access to services using a set of decentralized networked nodes that share a private permissioned blockchain data structure or a decentralized personal ledger, to which access has been limited to users authorized by one of the set of decentralized networked nodes, which instructions when executed by the one or more processors implement:

an authentication logic configured to authenticate a requesting user using a decrypted user credential obtained by decrypting, using a user private key in a keystore presented by the requesting user, an encrypted user credential retrieved by querying, using a user public key, a key-value store, the user public key generated along with the user private key;

a verification logic configured to search nodes of a private permissioned blockchain data structure or a decentralized personal ledger, to obtain information indicating a change in privilege or status is warranted for the decrypted user credential;

a modification logic configured to change a property of the decrypted user credential when the information indicating a change in privilege or status is warranted is found; wherein a change in property limits access to services provided by the set of decentralized networked nodes that share a private permissioned blockchain data structure or a decentralized personal ledger, to which access has been limited to users authorized by one of the set of decentralized networked nodes; and an output logic configured to communicate to other decentralized nodes a command to modify an action including at least one of pause an action, limit an amount associated with an action, and deny an action, due to the change in privilege or status.

2. The system of claim 1, further comprising:

a connection to one or more servers to receive from a government or a private licensure authority, information including one or more of an approval, an issuance, a revocation, or a suspension, of a license;

a trained classifier to classify the information as to whether a change in privilege or status of a credentialled individual is indicated; and a block chain interface logic configured to create a node on the private permissioned blockchain data structure or a decentralized personal ledger, the node including information indicating a change in privilege or status is warranted.

3. The system of claim 1, wherein a user credential of the requesting user is provisioned by a user credential administration logic.

4. The system of claim 3, wherein the user credential comprises the user public key.

5. The system of claim 3, wherein the user credential comprises at least one of a user identifier (ID) of the requesting user, a digital signature, and metadata information about the requesting user.

6. The system of claim 3, wherein the user credential is encrypted using (i) an administrative private key of the user credential administration logic and (ii) the user public key to generate the encrypted user credential.

7. The system of claim 6, wherein the encrypted user credential is generated by the user credential administration logic using a decentralized identity communication (DIDComm) messaging protocol, wherein DIDComm messaging protocol uses the administrative private key as a sender and the user public key as a recipient, and generates the encrypted user credential as a shared secret by executing an Elliptic Curve Diffie-Hellman (ECDH) key exchange.

8. The system of claim 3, wherein the encrypted user credential is transmitted to the key-value store by the user credential administration logic.

9. The system of claim 8, wherein the encrypted user credential is indexed on the key-value store by the user public key.

10. The system of claim 3, wherein the user private key is generated by the user credential administration logic.

11. The system of claim 10, wherein the user private key is transmitted to the keystore by the user credential administration logic.

12. The system of claim 6, wherein the user credential administration logic executes on an administrative device.

13. The system of claim 12, wherein the user private key is removed from the administrative device after the user private key is transmitted to the keystore.

14. The system of claim 12, wherein the user credential is removed from the administrative device after the user private key is transmitted to the keystore.

15. The system of claim 12, wherein the encrypted user credential is removed from the administrative device after the user private key is transmitted to the keystore.

16. The system of claim 12, wherein the administrative private key is removed from the administrative device after the user private key is transmitted to the keystore.

17. The system of claim 1, wherein the key-value store includes one of: (i) a decentralized network, (ii) a decentralized blockchain network, and (iii) a database.

18. The system of claim 1, wherein the authentication logic is further configured to use an elliptic curve cryptography function to generate the user public key based on the user private key.

19. The system of claim 1, wherein respective user-specific authentication logics run on respective user devices having respective keystores.

20. The system of claim 1, wherein the authentication logic is further configured to use an authentication token of a user device that has the keystore to access the key-value store.

21. The system of claim 20, wherein the authentication logic is further configured to receive the user private key from the keystore in response to a user authenticating into the user device.

22. The system of claim 21, wherein the requesting user seeks authentication to a particular application running on the user device.

23. The system of claim 22, wherein the authentication logic is further configured to authenticate the requesting user into a particular application using the decrypted user credential.

24. The system of claim 23, wherein the authentication logic is further configured to receive the user private key from the keystore in response to one of (i) a user authenticating into the particular application, and (ii) the keystore and a user device being tapped against each other.

25. The system of claim 6, wherein the administrative private key is an ephemeral key.

26. The system of claim 1, wherein the authentication logic is further configured to receive, using DIDComm messaging protocol and (ECDH) key exchange, the encrypted user credential from the key-value store.

27. A method for managing user access to one of a set of decentralized networked nodes that share a private permissioned blockchain data structure or a decentralized personal ledger, to which access has been limited to users authorized by one of the set of decentralized networked nodes, the method comprising:
   authenticating a requesting user using a decrypted user credential obtained by decrypting, using a user private key in a keystore presented by the requesting user, an encrypted user credential retrieved by querying, using a user public key, a key-value store, the user public key generated along with the user private key;
   searching nodes of a private permissioned blockchain data structure or a decentralized personal ledger, to obtain information indicating a change in privilege or status is warranted for the decrypted user credential;
   changing a property of the decrypted user credential when the information indicating a change in privilege or status is warranted is found; wherein a change in property limits access to services provided by the set of decentralized networked nodes that share a private permissioned blockchain data structure or a decentralized personal ledger, to which access has been limited to users authorized by one of the set of decentralized networked nodes; and
   communicating to other decentralized nodes a command to modify an action including at least one of pause an action, limit an amount associated with an action, and deny an action, due to the change in privilege or status.

28. A non-transitory computer readable medium storing instructions for managing user access to one of a set of decentralized networked nodes that share a private permissioned blockchain data structure or a decentralized personal ledger, to which access has been limited to users authorized by one of the set of decentralized networked nodes, which instructions when executed by one or more processors perform operations comprising:
   authenticating a requesting user using a decrypted user credential obtained by decrypting, using a user private key in a keystore presented by the requesting user, an encrypted user credential retrieved by querying, using a user public key, a key-value store, the user public key generated along with the user private key;
   searching nodes of a private permissioned blockchain data structure or a decentralized personal ledger, to obtain information indicating a change in privilege or status is warranted for the decrypted user credential;
   changing a property of the decrypted user credential when the information indicating a change in privilege or status is warranted is found; wherein a change in property limits access to services provided by the set of decentralized networked nodes that share a private permissioned blockchain data structure or a decentralized personal ledger, to which access has been limited to users authorized by one of the set of decentralized networked nodes; and
   communicating to other decentralized nodes a command to modify an action including at least one of pause an action, limit an amount associated with an action, and deny an action, due to the change in privilege or status.

* * * * *